United States Patent
Hsu et al.

(10) Patent No.: US 12,135,990 B2
(45) Date of Patent: Nov. 5, 2024

(54) MODELING AND COMPILING TENSOR PROCESSING APPLICATIONS FOR A COMPUTING PLATFORM USING MULTI-LAYER ADAPTIVE DATA FLOW GRAPHS

(71) Applicant: XILINX, INC., San Jose, CA (US)

(72) Inventors: Chia-Jui Hsu, Santa Clara, CA (US); Mukund Sivaraman, Palo Alto, CA (US); Vinod Kathail, Palo Alto, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/091,907

(22) Filed: Dec. 30, 2022

(65) Prior Publication Data
US 2024/0220316 A1 Jul. 4, 2024

(51) Int. Cl.
*G06F 9/48* (2006.01)
*G06F 8/41* (2018.01)
*G06F 9/54* (2006.01)

(52) U.S. Cl.
CPC ............ *G06F 9/4881* (2013.01); *G06F 8/451* (2013.01); *G06F 9/544* (2013.01)

(58) Field of Classification Search
CPC ......... G06F 9/544; G06F 8/451; G06F 9/4881
See application file for complete search history.

(56) References Cited

U.S. PATENT DOCUMENTS

| | | |
|---|---|---|
| 10,802,807 B1 | 10/2020 | Hsu et al. |
| 10,990,552 B1 | 4/2021 | Bilski et al. |
| 11,281,440 B1 | 3/2022 | Hsu et al. |
| 11,336,287 B1 | 5/2022 | Rodriguez et al. |
| 11,373,989 B1 | 6/2022 | Gandhi et al. |
| 2022/0198117 A1* | 6/2022 | Raumann ............... G06F 9/5011 |
| 2022/0269534 A1* | 8/2022 | Misra ................... G06F 15/7875 |
| 2022/0309322 A1* | 9/2022 | Nama .................... G06N 3/045 |

OTHER PUBLICATIONS

US 11,296,707 B1, 04/2022, Rodriguez et al. (withdrawn)
Edwards, S.A., "SHIM: A Language for Hardware/Software Integration," Department of Computer Science, Columbia University, Jan. 2004, 6 pgs.

(Continued)

*Primary Examiner* — Zachary K Huson
(74) *Attorney, Agent, or Firm* — Patterson + Sheridan, LLP

(57) ABSTRACT

Modeling and compiling tensor processing applications using multi-layer adaptive data flow (ML-ADF) graphs, including folding the ML-ADF graph for temporal sharing of platform resources, computing schedules for runtime orchestration of kernel execution, memory reuse, tensor and sub-volume movement, and dataflow synchronization, and generating binary code for processors of the target computing platform and re-targetable controller code. The ML-ADF graph may represent: tensor processing of a layer of a neural network as data flow through the data nodes and distribution to compute tiles across memory hierarchy; data flow amongst layers of the neural network using connections amongst data nodes of the respective layers; and multi-dimension data partitioning and distribution using tiling parameters associated with ports of the data nodes.

17 Claims, 28 Drawing Sheets

(56) References Cited

OTHER PUBLICATIONS

Alok, G. "Architecture Apocalypse Dream Architecture for Deep Learning Inference and Compute-VERSAL AI Core." Embedded World, 2020, 10 pgs.
Edwards, S.A., "SHIM: A Language for Hardware/Software Integration," Department of Computer Science, Columbia University, Jan. 2004, 20 pgs.
Gaide, B., et al., "Xilinx Adaptive Compute Acceleration Platform: Versal™ Architecture," 2019 ACM/SIGDA International Symposium on Field-Programmable Gate Arrays, Feb. 2019, pp. 84-93.
Xilinx, "ACAP at the Edge with the Versal AI Edge Series," WP518 (v1.0), 17 pgs, Jun. 9, 2021.
Xilinx, "Xilinx AI Engines and Their Applications," WP506 (v1.1) Jul. 10, 2020, 13 pgs.
Xilinx, "Versal Architecture and Product Data Sheet: Overview," Advanced Product Specification, DS950 (v1.16) Apr. 20, 2022, 35 pgs.
Bhattacharyya, S. S., et al., "Software Synthesis from Dataflow Graphs," Kluwer Academic Publishers, 1996.
U.S. Appl. No. 17/934,153 filed Sep. 21, 2022 Entitled "Modeling and Compiling Data Flow Across Memory Hierarchy on AI Engine Platform".

\* cited by examiner

```
class TinyYoloLayer1 : public graph
{
public:
    kernel superkernel[4][2];

shared_buffer<uint8> ofm;
    shared_buffer<uint8> wts;
    external_buffer<uint8> wts_ddr;

pktmerge<2> merge[4];

TinyYoloLayer1()
    {
        for (int i=0; i<4; i++)
        {
            for (int j=0; j<2; j++)
            {
                superkernel[i][j] = kernel::create(tiny_yolov2_wrapper<1,LRELU,int8,int8,bpc_sync_1d,bpc_sync_1d, bpc_async_1d>);
                source(superkernel[i][j]) = "src/mllib/tiny_yolov2_wrapper.cpp";
                initialization_function(superkernel[i][j]) = "node_init";
                runtime<ratio>(superkernel[i][j]) = 0.9;
                repetition_count(superkernel[i][j]) = 104;
                location<kernel>(superkernel[i][j]) = tile(i, j);
                location<stack>(superkernel[i][j]) = addresss(i, j, 0xe800);
            }
        }
    }
```

602 — class definition
604 — buffer declarations
606 — TinyYoloLayer1() constructor

FIG. 6A

```
608 ── ofm = shared_buffer<uint8>::create({ 8, 256, 2, 208 }, 4, 4);
610 ── wts = shared_buffer<uint8>::create({ 1408 }, 1, 2);

612 ⎰ location<buffer>(ofm) = address(1,0,167936+1024);
    ⎱ location<buffer>(wts) = address(3,0,0);

wts_ddr = external_buffer<uint8>::create({ 1408 }, 0, 1);

for (int i=0; i<4; i++)
{
  merge[i] = pktmerge<2>::create();
}

⎧ connect<stream>(wts_ddr.out[0], wts.in[0]);
        ⎪ read_access(wts_ddr.out[0]) = tiling({ .buffer_dimension = { 1408 },.tiling_dimension = { 1408 },.offset = { 0 } });   ⎫
622 ⎨ write_access(wts.in[0]) = tiling({ .buffer_dimension = { 1408 },.tiling_dimension = { 1408 },.offset = { 0 } });        ⎬ 628
        ⎪ location<dma>(wts_ddr.out[0]) = dma_channel(shim_tile, 3, 0, 0); ─── 624                                              ⎭
        ⎩ location<dma>(wts.in[0]) = dma_channel(memory_tile, 3, 0, 0); ─── 626 for (int j=0; j<2; j++)
{
  for (int i=0; i<4; i++)
  {
        ⎧ connect(wts.out[j], superkernel[i][j].in[1]);
614 ⎨ dimensions(superkernel[i][j].in[1]) = {704};
        ⎪ location<buffer>(superkernel[i][j].in[1]) = { address(i,j,0x4000), address(i,j,0x6000) };
        ⎩ location<dma>(superkernel[i][j].in[1]) = dma_channel(aie_tile, i, j, 1);
  }
        ⎧ read_access(wts.out[j]) = { tiling({ .buffer_dimension = { 1408 },.tiling_dimension = { 704 },.offset = { j * 704 },.tile_traversal = {}..
630 ⎨     .packet_port_id = -1,.repetition = 104}) };
        ⎩ location<dma>(wts.out[j]) = dma_channel(memory_tile, 3, 0, j);
}
```

FIG. 6B

```
for (int i=0; i<4; i++)
{
  for (int j=0; j<2; j++)
  {
    connect(superkernel[i][j].out[0], merge[i].in[j]);
    dimensions(superkernel[i][j].out[0]) = {8*16*1*8};
    storage_size(superkernel[i][j].out[0]) = 32768;
    async_repetition(superkernel[i][j].out[0]) = 1;
    location<buffer>(superkernel[i][j].out[0]) = { address(i,j,0x8000), address(i,j,0xa000) };
    location<dma>(superkernel[i][j].out[0]) = dma_channel(aie_tile, i, j, 0);
  }
}
                                                                                                    ─ 616

618 ── connect<pktstream>(merge[i].out[0], ofm.in[i]);

write_access(ofm.in[i]) = { tiling({ .buffer_dimension = { 8, 256, 2, 208 },.tiling_dimension = { 8, 16, 1, 8 },.offset = { 0, 16*i, 0, 0 },
                .tile_traversal = { { .dimension = 3,.stride = 8,.wrap = 26 } },.packet_port_id = 0,.repetition = 1,.phase = 0 }),
              tiling({ .buffer_dimension = { 8, 256, 2, 208 },.tiling_dimension = { 8, 16, 1, 8 },.offset = { 0, 16*i, 1, 0 },
                .tile_traversal = { { .dimension = 3,.stride = 8,.wrap = 26 } },.packet_port_id = 1,.phase = 0 }),
              tiling({ .buffer_dimension = { 8, 256, 2, 208 },.tiling_dimension = { 8, 16, 1, 8 },.offset = { 0, 16*i + 16*4, 0, 0 },
                .tile_traversal = { { .dimension = 3,.stride = 8,.wrap = 26 } },.packet_port_id = 0,.repetition = 1,.phase = 0 }),
              tiling({ .buffer_dimension = { 8, 256, 2, 208 },.tiling_dimension = { 8, 16, 1, 8 },.offset = { 0, 16*i + 16*4, 1, 0 },
                .tile_traversal = { { .dimension = 3,.stride = 8,.wrap = 26 } },.packet_port_id = 1,.repetition = 1,.phase = 0 }),
              tiling({ .buffer_dimension = { 8, 256, 2, 208 },.tiling_dimension = { 8, 16, 1, 8 },.offset = { 0, 16*i + 16*8, 0, 0 },
                .tile_traversal = { { .dimension = 3,.stride = 8,.wrap = 26 } },.packet_port_id = 0,.repetition = 1,.phase = 1 }),
              tiling({ .buffer_dimension = { 8, 256, 2, 208 },.tiling_dimension = { 8, 16, 1, 8 },.offset = { 0, 16*i + 16*8, 1, 0 },
                .tile_traversal = { { .dimension = 3,.stride = 8,.wrap = 26 } },.packet_port_id = 1,.repetition = 1,.phase = 1 }),
              tiling({ .buffer_dimension = { 8, 256, 2, 208 },.tiling_dimension = { 8, 16, 1, 8 },.offset = { 0, 16*i + 16*12, 0, 0 },
                .tile_traversal = { { .dimension = 3,.stride = 8,.wrap = 26 } },.packet_port_id = 0,.repetition = 1,.phase = 1 }),
              tiling({ .buffer_dimension = { 8, 256, 2, 208 },.tiling_dimension = { 8, 16, 1, 8 },.offset = { 0, 16*i + 16*12, 1, 0 },
                .tile_traversal = { { .dimension = 3,.stride = 8,.wrap = 26 } },.packet_port_id = 1,.repetition = 1,.phase = 1 }) };

location<dma>(ofm.in[i]) = dma_channel(memory_tile, 1, 0, i);
```

FIG. 6C

```
void connect_layer(shared_buffer<uint8>& ifm)
{
  for (int i=0; i<4; i++)
  {
    for (int j=0; j<2; j++)
    {
      connect(ifm.out[i], superkernel[i][j].in[0]);
      dimensions(superkernel[i][j].in[0]) = {8*36*1*18};
      location<buffer>(superkernel[i][j].in[0]) = { address(i,j,0), address(i,j,0x2000) };
      location<dma>(superkernel[i][j].in[0]) = dma_channel(aie_tile, i, j, 0);
    }
    if (i==0)
    {
      read_access(ifm.out[i]) = { tiling({.buffer_dimension = { 4, 416, 1, 416 },.tiling_dimension = { 8, 36, 1, 18 },.offset = { 0, -1 + 32*i, 0, -1 },
                                          .tile_traversal = { { .dimension = 3,.stride = 16,.wrap = 26 }, { .dimension = 1,.stride = 32*4,.wrap = 2 } },
                                          .packet_port_id = -1,.repetition = 1,.phase = 0 }),
                                  tiling({.buffer_dimension = { 4, 416, 1, 416 },.tiling_dimension = { 8, 36, 1, 18 },.offset = { 0, -1 + 32*i + 32*4*2, 0, -1 },
                                          .tile_traversal = { { .dimension = 3,.stride = 16,.wrap = 26 }, { .dimension = 1,.stride = 32*4,.wrap = 2 } },
                                          .packet_port_id = -1,.repetition = 1,.phase = 1 }) };
    }
    else
    {
      read_access(ifm.out[i]) = { tiling({.buffer_dimension = { 4, 416, 1, 416 },.tiling_dimension = { 8, 36, 1, 18 },.offset = { 0, -1 + 32*i, 0, -1 },
                                          .tile_traversal = { { .dimension = 3,.stride = 16,.wrap = 26 }, { .dimension = 1,.stride = 32*4,.wrap = 2 } },
                                          .packet_port_id = -1,.repetition = 1,.phase = 0 }),
                                  tiling({.buffer_dimension = { 4, 416, 1, 416 },.tiling_dimension = { 8, 36, 1, 18 },.offset = { 0, -1 + 32*i + 32*4*2, 0, -1 },
                                          .tile_traversal = { { .dimension = 3,.stride = 16,.wrap = 26 }, { .dimension = 1,.stride = 1000,.wrap = 2 } },
                                          .packet_port_id = -1,.repetition = 1,.phase = 1 }) };
    }
    location<dma>(ifm.out[i]) = dma_channel(memory_tile, 1, 0, i);
  }
};
```

```
class TinyYoloLayer2 : public graph
{
public:
    kernel superkernel[4][2];

shared_buffer<uint8> ofm;
    shared_buffer<uint8> wts;
    external_buffer<uint8> wts_ddr;

pktmerge<2> merge[4];

TinyYoloLayer2()
    {
        for (int i=0; i<4; i++)
        {
            for (int j=0; j<2; j++)
            {
                superkernel[i][j] = kernel::create(tiny_yolov2_wrapper<1,LRELU,int8,int8,bpc_sync_1d,bpc_sync_1d, bpc_async_1d>);
                source(superkernel[i][j]) = "src/mllib/tiny_yolov2_wrapper.cpp";
                runtime<ratio>(superkernel[i][j]) = 0.9;
                repetition_count(superkernel[i][j]) = 52;
                location<kernel>(superkernel[i][j]) = tile(i, j);
                initialization_function(superkernel[i][j]) = "node_init";
                location<stack>(superkernel[i][j]) = address(i, j, 0xe800);
            }
        }
    }
```

FIG. 6E

```
ofm = shared_buffer<uint8>::create({ 8, 128, 4, 104 }, 4, 4);
wts = shared_buffer<uint8>::create({ 4992 }, 1, 2);

location<buffer>(ofm) = address(0,0,0);
location<buffer>(wts) = address(3,0,0);

wts_ddr = external_buffer<uint8>::create({ 4992 }, 0, 1);

for (int i=0; i<4; i++)
{
    merge[i] = pktmerge<2>::create();
} connect(wts.out[0], wts.in[0]);
read_access(wts_ddr.out[0]) = tiling({.buffer_dimension = { 4992 },.tiling_dimension = { 4992 },.offset = { 0 } });
write_access(wts.in[0]) = tiling({.buffer_dimension = { 4992 },.tiling_dimension = { 4992 },.offset = { 0 } });
location<dma>(wts_ddr.out[0]) = dma_channel(shim_tile, 3, 0, 0);
location<dma>(wts.in[0]) = dma_channel(memory_tile, 3, 0, 0);

for (int j=0; j<2; j++)
{
    for (int i=0; i<4; i++)
    {
        connect(wts.out[j], superkernel[i][j].in[1]);
        dimensions(superkernel[i][j].in[1]) = { 2496 };
        location<buffer>(superkernel[i][j].in[1]) = { address(i,j,0x4000), address(i,j,0x6000) };
        location<dma>(superkernel[i][j].in[1]) = dma_channel(aie_tile, i, j, 1);
    } read_access(wts.out[j]) = { tiling({.buffer_dimension = { 4992 },.tiling_dimension = { 2496 },.offset = { j * 2496 },.tile_traversal = {} ,.packet_port_id = -1,.repetition = 52}) };
    location<dma>(wts.out[j]) = dma_channel(memory_tile, 3, 0, j);
}
```

FIG. 6F

```
for (int i=0; i<4; i++)
{
  for (int j=0; j<2; j++)
  {
    connect(superkernel[i][j].out[0], merge[i].in[j]);
    dimensions(superkernel[i][j].out[0]) = { 8*16*2*4 };
    storage_size(superkernel[i][j].out[0]) = 32768;
    async_repetition(superkernel[i][j].out[0]) = 1;
    location<buffer>(superkernel[i][j].out[0]) = { address(i,j,0x8000), address(i,j,0xa000) };
    location<dma>(superkernel[i][j].out[0]) = dma_channel(aie_tile, i, j, 0);
  }
  connect<pktstream>(merge[i].out[0], ofm.in[i]);
  write_access(ofm.in[i]) = { tiling({ .buffer_dimension = { 8, 128, 4, 104 },.tiling_dimension = { 8, 16, 2, 4 },.offset = { 0, 16*i, 0, 0 },
                                        .tile_traversal = { { .dimension = 3,.stride = 4,.wrap = 26 } },.packet_port_id = 0 }),
                               tiling({ .buffer_dimension = { 8, 128, 4, 104 },.tiling_dimension = { 8, 16, 2, 4 },.offset = { 0, 16*i, 2, 0 },
                                        .tile_traversal = { { .dimension = 3,.stride = 4,.wrap = 26 } },.packet_port_id = 1 }),
                               tiling({ .buffer_dimension = { 8, 128, 4, 104 },.tiling_dimension = { 8, 16, 2, 4 },.offset = { 0, 16*i + 16*4, 0, 0 },
                                        .tile_traversal = { { .dimension = 3,.stride = 4,.wrap = 26 } },.packet_port_id = 0 }),
                               tiling({ .buffer_dimension = { 8, 128, 4, 104 },.tiling_dimension = { 8, 16, 2, 4 },.offset = { 0, 16*i + 16*4, 2, 0 },
                                        .tile_traversal = { { .dimension = 3,.stride = 4,.wrap = 26 } },.packet_port_id = 1 })};
  location<dma>(ofm.in[i]) = dma_channel(memory_tile, 1, 0, i);
}
```

FIG. 6G

```
void connect_layer(shared_buffer<uint8>& ifm)
{
  for (int i=0; i<4; i++)
  {
    for (int j=0; j<2; j++)
    {
      connect(ifm.out[j], superkernel[i][j].in[0]);
      dimensions(superkernel[i][j].in[0]) = { 8*36*2*10 };
      location<buffer>(superkernel[i][j].in[0]) = { address(i,j,0), address(i,j,0x2000) };
      location<dma>(superkernel[i][j].in[0]) = dma_channel(aie_tile, i, j, 0);
    }
  }
  read_access(ifm.out[i]) = tiling({.buffer_dimension = { 8, 256, 2, 208 },.tiling_dimension = { 8, 36, 2, 10 },.offset = { 0, -1 + 32*i, 0, -1 },
    .tile_traversal = { { .dimension = 3,.stride = 8,.wrap = 26 }, { .dimension = 1,.stride = 32*4,.wrap = 2 } },
    .packet_port_id = -1,.repetition = 1,.phase=0,.boundary_dimension = {8, 208, 2, 208}});
  location<dma>(ifm.out[i]) = dma_channel(memory_tile, 1, 0, i);
};
```

```
{Schedule: loop 1
    {Schedule: loop 1
        {InitializeLock: g.k1.in[0]}
        {InitializeLock: g.k1.in[0]}
        {ConfigureBD: g.k1.in[0]}
        {EnqueueTask: g.k1.in[0]}
        {InitializeWindowBufferPort: g.k1.in[0]}
        {InitializeLock: g.k1.in[1]}
        {InitializeLock: g.k1.in[1]}
        {ConfigureBD: g.k1.in[1]}
        {EnqueueTask: g.k1.in[1]}
        {InitializeWindowBufferPort: g.k1.in[1]}
        {InitializeLock: g.k1.out[0]}
        {InitializeLock: g.k1.out[0]}
        {ConfigureBD: g.k1.out[0]}
        {EnqueueTask: g.k1.out[0]}
        {InitializeWindowBufferPort: g.k1.out[0]}
        {InitializeLock: g.k1.out[0]}
        {ConfigureBD: g.k1.out[0]}
        {EnqueueTask: g.k1.out[0]}
        {Schedule: loop 16
            {InvokeKernel: g.k1}
        }
    }
    {Schedule: loop 1
        {InitializeLock: g.k2.in[0]}
        {InitializeLock: g.k2.in[0]}
        {ConfigureBD: g.k2.in[0]}
        {EnqueueTask: g.k2.in[0]}
        {InitializeWindowBufferPort: g.k2.in[0]}
        {InitializeLock: g.k2.in[1]}
        {InitializeLock: g.k2.in[1]}
        {ConfigureBD: g.k2.in[1]}
        {EnqueueTask: g.k2.in[1]}
        {InitializeWindowBufferPort: g.k2.in[1]}
        {AcquireLock: }
        {ReleaseLock: }
        {InitializeLock: g.k2.out[0]}
        {InitializeLock: g.k2.out[0]}
        {ConfigureBD: g.k2.out[0]}
        {EnqueueTask: g.k2.out[0]}
        {InitializeWindowBufferPort: g.k2.out[0]}
        {InitializeLock: g.k2.out[0]}
        {ConfigureBD: g.k2.out[0]}
        {EnqueueTask: g.k2.out[0]}
        {Schedule: loop 4
            {InvokeKernel: g.k2}
        }
    }
}
```

FIG. 9

```
{Schedule loop 1
    InitializeLock: g.ifm_ddr}
    InitializeLock: g.ifm_ddr}
    ConfigureDD: g.ifm_ddr.out(0)}
    EnqueueTask: g.ifm_ddr.out(0)}
    InitializeLock: g.ifm1}
    InitializeLock: g.ifm1}
    ConfigureDD: g.ifm1.in(0)}
    EnqueueTask: g.ifm1.in(0)}
    AcquireLock: g.ifm1}
    ConfigureDD: g.ifm1.out(0)}
    EnqueueTask: g.ifm1.out(0)}
    InitializeLock: g.wts1_ddr}
    InitializeLock: g.wts1_ddr}
    ConfigureDD: g.wts1_ddr.out(0)}
    EnqueueTask: g.wts1_ddr.out(0)}
    InitializeLock: g.wts1}
    InitializeLock: g.wts1}
    ConfigureDD: g.wts1.in(0)}
    EnqueueTask: g.wts1.in(0)}
    AcquireLock: g.wts1}
    ConfigureDD: g.wts1.out(0)}
    EnqueueTask: g.wts1.out(0)}
    InitializeLock: g.ifm2}
    InitializeLock: g.ifm2}
    ConfigureDD: g.ifm2.in(0)}
    EnqueueTask: g.ifm2.in(0)}
    AcquireLock: g.ifm2}
    ConfigureDD: g.ifm2.out(0)}
    EnqueueTask: g.ifm2.out(0)}
    InitializeLock: g.wts2_ddr}
    InitializeLock: g.wts2_ddr}
    ConfigureDD: g.wts2_ddr.out(0)}
    EnqueueTask: g.wts2_ddr.out(0)}
    InitializeLock: g.wts2}
    InitializeLock: g.wts2}
    ConfigureDD: g.wts2.in(0)}
    EnqueueTask: g.wts2.in(0)}
    AcquireLock: g.wts2}
    ConfigureDD: g.wts2.out(0)}
    EnqueueTask: g.wts2.out(0)}
    InitializeLock: g.ifm3}
    InitializeLock: g.ifm3}
    ConfigureDD: g.ifm3.in(0)}
    EnqueueTask: g.ifm3.in(0)}
    AcquireLock: g.ifm3}
    ConfigureDD: g.ifm3.out(0)}
    EnqueueTask: g.ifm3.out(0)}
    InitializeLock: g.ofm_ddr}
    InitializeLock: g.ofm_ddr}
    ConfigureDD: g.ofm_ddr.in(0)}
    EnqueueTask: g.ofm_ddr.in(0)}
    AcquireLock: g.ofm_ddr}
}
```

```
__LOG__("Initialize lock for g.layer2.wts_ddr")
adf::initializeLock(adf::shim_tile, 3, 0, 0, 0);
__LOG__("Initialize lock for g.layer2.wts_ddr")
adf::initializeLock(adf::shim_tile, 3, 0, 1, 0);
{
    __LOG__("configure BD for g.layer2.wts_ddr.out[0]")
    {
        adf::dma_buffer_descriptor bd =
        {
            .address = 0 + getExternalBufferAddress(1) / 4,
            .length = 1248,
            .stepsize = { 1 },
            .wrap = {}, .padding = {},
            .enable_packet = false,
            .packet_id = 0,
            .out_of_order_bd_id = 0,
            .tlast_suppress = false,
            .iteration_stepsize = 0,
            .iteration_wrap = 0,
            .iteration_current = 0,
            .enable_compression = false,
            .lock_acq_enable = true,
            .lock_acq_value = 0,
            .lock_acq_id = 0,
            .lock_rel_value = 1,
            .lock_rel_id = 1,
            .use_next_bd = false,
            .next_bd = 0
        };
        adf::configureBufferDescriptor(adf::shim_tile, 3, 0, 0, bd);
    }
    __LOG__("Enqueue task for g.layer2.wts_ddr.out[0]")
        adf::enqueueTask(adf::shim_tile, 3, 0, adf::dma_mm2s, 0, 0, 1, false);
}
```

```
__LOG__("Initialize lock for g.layer2.wts")
adf::initializeLock(adf::memory_tile, 3, 0, 0, 0);
__LOG__("Initialize lock for g.layer1.wts")
adf::initializeLock(adf::memory_tile, 3, 0, 1, 0);
{
    __LOG__("Configure BD for g.layer2.wts.in[0]")
    {
        adf::dma_buffer_descriptor bd =
        {
            .address = 131072,
            .length = 1248,
            .stepsize = { 1 },
            .wrap = {},
            .padding = { { 0, 0 } },
            .enable_packet = false,
            .packet_id = 0,
            .out_of_order_bd_id = 0,
            .tlast_suppress = false,
            .iteration_stepsize = 0,
            .iteration_wrap = 0,
            .iteration_current = 0,
            .enable_compression = false,
            .lock_acq_enable = true,
            .lock_acq_value = 0,
            .lock_acq_id = 65,
            .lock_rel_value = 1,
            .lock_rel_id = 64,
            .use_next_bd = false,
            .next_bd = 0
        };
        adf::configureBufferDescriptor(adf::memory_tile, 3, 0, 0, bd);
    }
    __LOG__("Enqueue task for g.layer2.wts.in[0]")
    adf::enqueueTask(adf::memory_tile, 3, 0, adf::dma_s2mm, 0, 0, 1, false);
}
__LOG__("Acquire synchronization lock between producers and consumers")
adf::acquireLock(adf::memory_tile, 3, 0, 0, 1);
{
    __LOG__("Configure BD for g.layer2.wts.out[0]")
```

```
{
    adf::dma_buffer_descriptor bd =
    {
        .address = 131072,
        .length = 624,
        .stepsize = { 1 },
        .wrap = {},
        .padding = { { 0, 0 } },
        .enable_packet = false,
        .packet_id = 0,
        .out_of_order_bd_id = 0,
        .tlast_suppress = false,
        .iteration_stepsize = 0,
        .iteration_wrap = 0,
        .iteration_current = 0,
        .enable_compression = false,
        .lock_acq_enable = true,
        .lock_acq_value = 1,
        .lock_acq_id = 64,
        .lock_rel_value = 1,
        .lock_rel_id = 65,
        .use_next_bd = false,
        .next_bd = 0
    };
    adf::configureBufferDescriptor(adf::memory_tile, 3, 0, 0, bd);
}
__LOG__("Enqueue task for g.layer2.wts.out[0]")
    adf::enqueueTask(adf::memory_tile, 3, 0, adf::dma_mm2s, 0, 0, 52, false);
}
```

```
{
    __LOG__("Configure BD for g.layer2.wts.out[1]")
    {
        adf::dma_buffer_descriptor bd =
        {
            .address = 131696,
            .length = 624,
            .stepsize = { 1 },
            .wrap = {},
            .padding = { { 0, 0 } },
            .enable_packet = false,
            .packet_id = 0,
            .out_of_order_bd_id = 0,
            .tlast_suppress = false,
            .iteration_stepsize = 0,
            .iteration_wrap = 0,
            .iteration_current = 0,
            .enable_compression = false,
            .lock_acq_enable = true,
            .lock_acq_value = 1,
            .lock_acq_id = 64,
            .lock_rel_value = 1,
            .lock_rel_id = 65,
            .use_next_bd = false,
            .next_bd = 0
        };
        adf::configureBufferDescriptor(adf::memory_tile, 3, 0, 24, bd);
    }
    __LOG__("Enqueue task for g.layer2.wts.out[1]")
        adf::enqueueTask(adf::memory_tile, 3, 0, adf::dma_mm2s, 1, 24, 52, false);
}
```

FIG. 15

MODELING AND COMPILING TENSOR PROCESSING APPLICATIONS FOR A COMPUTING PLATFORM USING MULTI-LAYER ADAPTIVE DATA FLOW GRAPHS

TECHNICAL FIELD

Examples of the present disclosure generally relate to modeling and compiling tensor processing applications for a computing platform using multi-layer adaptive data flow graphs.

BACKGROUND

Some varieties of integrated circuits provide architectures that include multiple compute units. Such ICs are capable of providing significant computational power and a high degree of parallelism. Applications can be created for execution on target hardware having a multi-compute unit architecture using a data flow model of computation. For example, machine learning applications are often specified using a data flow model of computation. Examples of computational data flow models used to create applications include synchronous data flow, cyclo-static data flow, and multi-dimensional data flow. Each of these computational models focuses on data production properties and data consumption properties between computational nodes in a data flow graph used to specify the application. In general, a data flow graph is a collection of nodes and edges in which the nodes represent operations performed on data and the edges represent communication links that convey data among the nodes.

An application intended to execute on a multi-compute unit hardware architecture often consumes significant amounts of data. The ability to efficiently provide data to the compute units and output resulting data from the compute units has a significant effect on runtime performance of the application as executed on the target hardware.

SUMMARY

Techniques for modeling and compiling tensor processing applications for a computing platform using multi-layer adaptive data flow (ADF) graphs are described. Examples of tensor processing applications include but not limited to machine learning neural networks and video processing pipeline.

One example is a method that includes: defining a multi-layer data flow graph as a dataflow graph where multi-dimension data storage and movement across memory hierarchy is represented in the graph using data nodes and connections across data nodes, multi-dimension data partitioning and distribution is represented using tiling parameters associated with ports of a data node, tensor processing of a layer is represented as data flow through data nodes and distribution to compute nodes across memory hierarchy (e.g., external memory to shared on-chip memory to local data memory in processing elements), data are processed in parallel by compute nodes, and resulting tensor sub-volumes are gathered back to data nodes in memory hierarchy for the next layer of processing, and data flow representation of multiple tensor processing layers (including combination of parallel branches and sequential layers) are connected accordingly to form a multi-layer data flow graph representing the target tensor processing application Another example is a method that includes: receiving a multi-layer adaptive data flow (ML-ADF) graph specifying an application for execution on a data processing array (DPA) that includes data processing elements (DPEs) and local, shared, and external memories; folding the ML-ADF graph onto the DPA to provide an overlay graph, where the overlay graph represents the DPEs and the local and shared memories, and where resources of the DPA are temporally shared amongst multiple layers of the ML-ADF graph; constructing DPE schedules for compute nodes of the ML-ADF graph and a data transfer schedule corresponding to shared-data and external-data nodes of the ML-ADF graph in order to coordinate runtime execution of layers of the ML-ADF graph by the DPEs and sharing of data amongst the layers of the ML-ADF graph through the shared and external memories; generating DPE code for the DPEs based on the respective DPE schedules; and generating controller code for controllers and data movers of the local, shared and external memories based on the data transfer schedule.

Another example is a compiler that represents a multi-layer tensor processing application as a multi-layer adaptive data flow (ML-ADF) graph (e.g., as defined above), and generates machine-readable code that configures a target computing platform to execute a first layer of the ML-ADF graph on compute tiles of the target computing platform, and re-configures the target computing platform for each additional layer of the ML-ADF graph to execute each additional layer of the ML-ADF graph on the compute tiles.

In an embodiment, the target computing platform includes a data processing array and resources external to the data processing array. The data processing array includes the compute tiles, memory tiles, and interface tiles. The compute tiles includes processing cores, data memory, program memory, configurable direct memory access (DMA) circuitry, and configurable interconnect circuitry. The memory tiles includes memory, configurable DMA circuitry, and configurable interconnect circuitry. The interface tiles includes configurable DMA circuitry and configurable interconnect circuitry. The resources external to the data processing array include external memory and controller circuitry. And the machine-readable code comprises core code to cause the compute tiles to configure the interconnect circuitry of the compute tiles for each layer of the ML-ADF graph, and controller code to cause the controller circuitry to reconfigure the interconnect circuitry of the memory tiles and the interface tiles for each layer of the ML-ADF graph.

In an embodiment, the compiler represents the multi-layer tensor processing application as a ML-ADF graph by: representing multi-dimension data storage and data movement through a memory hierarchy that includes the external memory, the memory tiles, and the data memory of the compute tiles, using data nodes and connections amongst the data nodes; representing tensor processing of a layer of the ML-ADF graph as data flow through the data nodes and distribution to compute tiles across memory hierarchy; representing data flow amongst layers of the ML-ADF graph (including sequential layers and layers in parallel branches) using connections amongst data nodes of the respective layers; and representing multi-dimension data partitioning and distribution using tiling parameters associated with ports of the data nodes.

In an embodiment, the compiler generates the machine-readable code to configure the target computing system to execute kernels of a layer of the ML-ADF graph in parallel, share tensors amongst layers of the ML-ADF graph through the memory tiles, distribute sub-volumes of the tensors amongst the compute tiles, temporally share the compute tiles and the memory tiles amongst the layers of the ML-ADF graph, and spatially share the memory tiles amongst the compute tiles within the layers of the ML-ADF graph.

In an embodiment, the compiler generates machine-readable code by folding the ML-ADF graph over the target computing platform to provide an overlay graph in which resources of the target computing platform are temporally shared amongst the layers of ML-ADF graph, constructing schedules for the compute tiles, the memory tiles, and the interface tiles based on the overlay graph and the ML-ADF graph, computing mapping and routing parameters based on the overlay graph, generating core code for the compute tiles based on the respective schedules and the mapping and routing parameters to cause the compute tiles to reconfigure the DMA circuitry and the interconnect circuitry of the compute tiles for each layer of the ML-ADF graph and to execute the respective layers, and generating controller code based on the associated schedules and mapping and routing parameters to cause the controller circuitry to reconfigure the DMA circuitry and the interconnect circuitry of the memory tiles and the DMA circuitry and the interconnect circuitry of the interface tiles for each layer of ML-ADF graph.

Another example is an integrated circuit (IC) device that includes a computing platform that executes compute nodes of a first layer of a multi-layer tensor processing application on compute tiles of the computing platform, and executes compute nodes of each additional layer of the multi-layer tensor processing application on the compute tiles of the computing platform (i.e., shares compute tiles amongst layers of the multi-layer tensor processing application).

In an embodiment, the computing platform executes the compute nodes of each layer of the multi-layer tensor processing application on the compute tiles in parallel, shares tensors amongst layers of the multi-layer tensor processing application through the memory tiles, distributes sub-volumes of the tensors amongst the compute tiles, temporally shares the compute tiles and the memory tiles amongst the layers of the multi-layer tensor processing application, and spatially share the memory tiles amongst the compute tiles within the layers of the multi-layer tensor processing application.

In an embodiment, the computing platform includes a data processing array and resources external to the data processing array, the data processing array includes the compute tiles, memory tiles, and interface tiles to interface with the resources external to the data processing array, the resources external to the array comprise controller circuitry and external memory, the compute tiles are configured to configure DMA circuitry and interconnect circuitry of the compute tiles for each of the layers of the multi-layer tensor processing application, and the controller circuitry is configured to configure DMA circuitry and interconnect circuitry of the memory tiles and the interface tiles for each layer of the multi-layer tensor processing application.

In an embodiment, the compute tiles, the memory tiles and the interface tiles are initially configured for a first layer to provide an input feature map (IFM) tensor and a weight tensor from the external memory to the memory tiles, transfer sub-volumes of the IFM tensor and sub-volumes of the weight tensor from the memory tiles to data memory of the compute tiles, execute compute nodes of a first layer of the multi-layer tensor processing application on the compute tiles to process the IFM tensor sub-volumes and the weight tensor sub-volumes stored in the data memory of the compute tiles, and store outputs of the compute tiles as an output feature map (OFM) tensor of the first layer in the memory tiles. The compute tiles, the memory tiles and the interface tiles are reconfigured for a subsequent layer to transfer sub-volumes of an OFM tensor of a preceding layer of the multi-layer tensor processing application from the memory tiles to the data memory of the compute tiles, transfer the weight tensor of the subsequent layer from the external memory to the memory tiles, transfer sub-volumes of the weight tensor from the memory tiles to data memory of the compute tiles, execute compute nodes of a subsequent layer of the multi-layer tensor processing application on the compute tiles to process the sub-volumes of the OFM tensor of the preceding layer stored in the data memory of the compute tiles, and store outputs of the compute tiles as an OFM tensor of the subsequent layer in the memory tiles, and transfer the OFM tensor of the subsequent layer from the memory tiles to the external memory. The execution, reconfiguration, and data movement between a layer and a subsequent layer may occur sequentially or in parallel in pipelined fashion.

Another example is a method that includes executing a multi-layer tensor processing application on compute tiles of a computing platform, where the executing includes configuring the computing platform to execute compute nodes of a first layer of the multi-layer tensor processing application on the compute tiles, and re-configuring the computing platform to execute compute nodes of each additional layer of the multi-layer tensor processing application on the compute tiles.

In an embodiment, the computing platform further includes memory tiles and the executing further includes executing the compute nodes of each layer of the multi-layer tensor processing application on the compute tiles in parallel, sharing tensors amongst the layers of the multi-layer tensor processing application through the memory tiles, distributing sub-volumes of the tensors amongst the compute tiles, temporally sharing the compute tiles and the memory tiles amongst the layers of the multi-layer tensor processing application, and spatially sharing the memory tiles amongst the compute tiles within the layers of the multi-layer tensor processing application.

In an embodiment, the computing platform includes a data processing array and memory external to the data processing array, the data processing array includes the compute tiles, the memory tiles, and interface tiles. In this example, the configuring includes configuring the compute tiles, the memory tiles and the interface tiles to provide an input feature map (IFM) tensor and a weight tensor from the external memory to the memory tiles, transfer sub-volumes of the IFM tensor and sub-volumes of the weight tensor from the memory tiles to data memory of the compute tiles, executing compute nodes of a first layer of the multi-layer tensor processing application on the compute tiles based on the IFM tensor volumes and the weight tensor volumes stored in the data memory of the compute tiles, and storing outputs of the compute tiles as an output feature map (OFM) tensor of the first layer in the memory tiles. Further in this example, the re-configuring includes reconfiguring the compute tiles, the memory tiles and the interface tiles to transfer sub-volumes of an OFM tensor of a preceding layer of the multi-layer tensor processing application from the memory tiles to the data memory of the compute tiles, transferring the weight tensor of the subsequent layer from the external memory to the memory tiles, transferring sub-volumes of the weight tensor from the memory tiles to data memory of the compute tiles, executing compute nodes of a subsequent layer of the multi-layer tensor processing application on the compute tiles to process the sub-volumes of the OFM tensor of the preceding layer stored in the data memory of the compute tiles, storing outputs of the compute tiles as an OFM tensor of the subsequent layer in the memory tiles, and transferring the OFM tensor of the subsequent layer from the memory tiles to the external memory.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 6A-6D illustrate example source code for a first layer of an example tensor processing application, Tiny YOLO, version 2, according to an embodiment.

FIGS. 6E-6H illustrate example source code for a second layer of Tiny YOLO, v2, according to an embodiment.

FIG. 9 depicts a schedule for a compute tile of the target computing platform, based on Tiny YOLO v2, according to an embodiment.

FIG. 10 depicts a schedule of tasks to be performed by a controller of the target computing platform with respect to interface tiles and memory tiles of the target computing platform, based on Tiny YOLO v2, according to an embodiment.

FIG. 11 depicts core code generated by the compilation system for Tiny YOLO v2, according to an embodiment.

FIGS. 12-15 depict controller code generated by the compilation system for Tiny YOLO v2, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
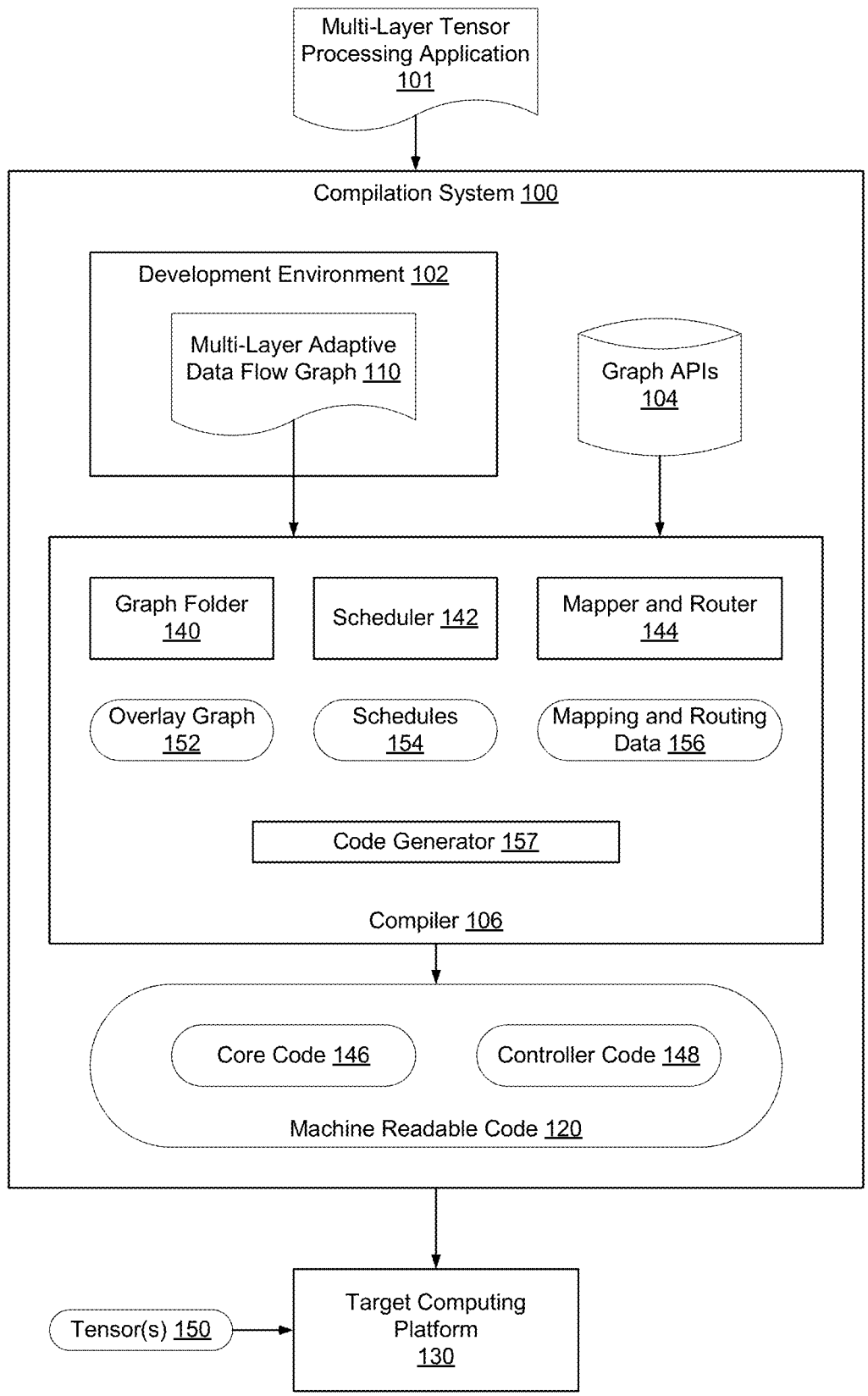
FIG. 1 is a block diagram of a compilation system that represents a multi-layer tensor processing application as a machine-readable abstraction, illustrated here as a multi-layer adaptive data flow (ML-ADF) graph 110, and compiles the ML-ADF graph to provide machine-readable code for a target computing platform, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

In some situations, such as wireless and signal processing systems, a graph programming model may assume that graph objects are mapped to dedicated resources of a target computing platform so that the objects can be compiled and executed in traditional data flow fashion (e.g., a kernel executes as soon as it has sufficient input data and sufficient output space, and memory channel transfers as soon as data is available and stalls on back pressure).

In other situations, allocation of dedicated resources may not be feasible. For example, in a machine learning application, a multi-layer network may have a relatively large number of computational layers, and each layer may attempt to utilize as many processing units or cores as possible to maximize data parallelism. Allocating dedicated resources for all layers may not be feasible due to the finite resources (e.g., processing units) of the target computing platform. In order to effectively use a target platform for a multi-layer application, temporal sharing and certain combinations of temporal and spatial sharing of platform resources may be useful. The term temporal sharing means platform resources are used by a layer at any given time, and the platform resources are reconfigured as necessary so the next layer in a later time can reuse the resources.

Embodiments herein describe modeling and compiling tensor processing applications for a computing platform using multi-layer adaptive data flow (ML-ADF) graphs. As used herein, the term "tensor" refers to an n-dimensional array. Tensor processing applications include, without limitation, machine learning neural networks and video processing pipelines.

Embodiments herein describe a ML-ADF graph in which, in addition to compute nodes, multi-dimensional data storage and movement across a memory hierarchy (e.g., from external memory, to shared on-chip memory, to local data memory in compute tiles) is represented using data nodes and connections between data nodes and compute nodes. Multi-dimensional data partitioning and distribution is represented using tiling parameters associated with ports of a data node. Tensor processing of a layer is represented as data flow through data nodes and distribution to compute nodes across the memory hierarchy data are processed in parallel by compute nodes, and resulting tensor sub-volumes are gathered back to data nodes in memory hierarchy for the next layer of processing. Data flow representation of multiple tensor processing layers (including combination of parallel branches and sequential layers) are connected accordingly to form a multi-layer data flow graph representing the target tensor processing application.

Embodiments herein describe multi-layer adaptive data flow (ML-ADF) graph semantics to enable specification of properties of a tensor processing application, such as parallel computing kernels for each layer, storage of tensors across memory hierarchy, tensor tiling and sub-volume distribution, and/or temporal and spatial sharing of platform resources.

Embodiments herein further describe compilation techniques to compile a multi-layer ADF graph onto a target computing platform. The compilation techniques may include graph folding, scheduling, and code generation. A graph compiler, as disclosed herein, may automatically fold a multi-layer ADF graph for temporal sharing of platform resources, compute schedules for runtime orchestration of kernel execution, memory, and memory reuse/reconfiguration, tensor and sub-volume movement, and dataflow synchronization, and generate core control program for each of multiple processing units of the target computing platform and re-targetable controller code.

FIG. 1 is a block diagram of a compilation system 100 that represents a multi-layer tensor processing application 101 as a machine-readable abstraction, illustrated here as a multi-layer adaptive data flow (ML-ADF) graph 110, and compiles ML-ADF graph 110 to provide machine readable code 120 (e.g., binary code) for a target computing platform 130, according to an embodiment. Multi-layer tensor processing application 101 may represent a neural network, an image or video processing application, and/or other multi-layer tensor processing application. Machine readable code 120 may be useful to process tensor(s) 150 (e.g., an input feature map and one or more weight tensors).

In the example of FIG. 1, compilation system 100 includes a development environment 102, graph application programming interfaces (APIs) 104, and a compiler 106. Compilation system 100 may be include circuitry and/or an instruction processor configured to execute instructions or code stored in memory.

ML-ADF graph 110 may be encoded as source code using a high-level programming language such as, without limitation, C, C++, Python, Javascript, Swift, Go, LabView, or Simulink. Development environment 102 may permit a user to manually encode ML-ADF graph 110 as source code. Alternatively, development environment 102 may encode ML-ADF graph 110 or portions thereof as source code based on user-input.

Graph APIs 104 permit a developer to interface with various aspects/features of development environment 102 and/or compiler 106.

ML-ADF graph 110 may include nodes and edges, where nodes represent compute kernel functions and edges represent data connections. Kernels may be compiled to run on compute engines 202.

ML-ADF graph 110 may have multiple kernels, input ports, and output ports. Graph connectivity, which is analogous to nets in a data flow graph, may be between kernels, between a kernel and input ports, and/or between a kernel and output ports, and may be configured as a connection. A graph runs for an iteration when it consumes data samples equal to a window or stream of data expected by the kernels in the graph, and produces data samples equal to the window or stream of data expected at the output of all the kernels in the graph.

Compiler 106 compiles the kernels and graph code of ML-ADF graph 110 to make connections and placements, and to provide checks to ensure proper functioning on target computing platform 130. Compiler 106 may allocate locks, memory buffers, and DMA channels and descriptors, and may generate routing information for mapping ML-ADF graph 110 onto target computing platform 130. Compiler 106 synthesizes a core program (i.e., core code 146) for each compute tile 202 that schedules the kernels on the cores and implements locking mechanisms and data copy among buffers. The core code 146 for each compute tile 202 may be compiled to provide loadable executable and linkable format (ELF) files. Compiler 106 may generate control application programming interfaces (APIs) to control graph initialization, execution, and termination from a main application.

Figure 2:
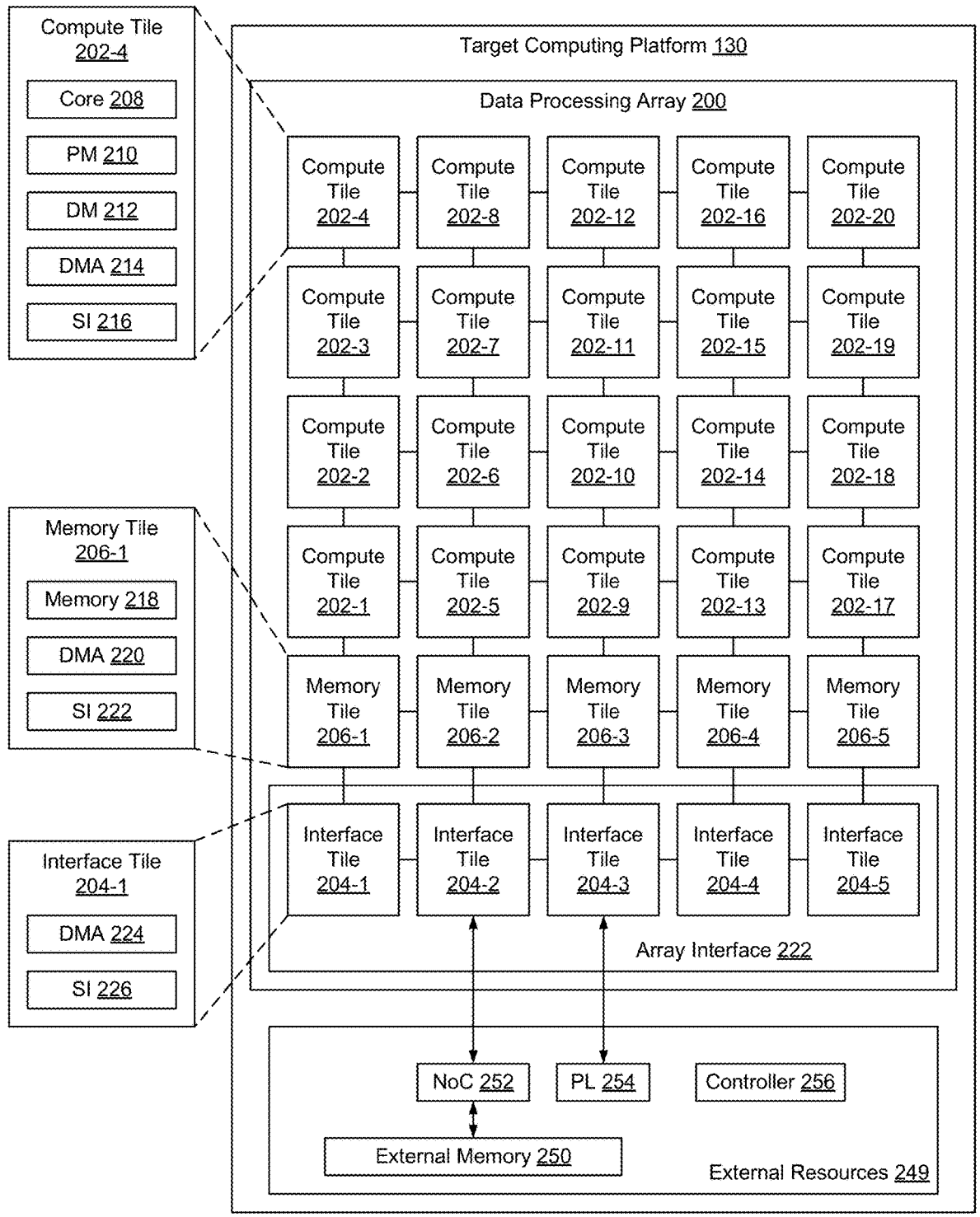
FIG. 2 is a block diagram of the target computing platform, according to an embodiment.

FIG. 2 is a block diagram of target computing platform 130, according to an embodiment. In the example of FIG. 2, target computing platform 130 includes a data processing array 200 and external resources 249. Data processing array 200 may be implemented or provided on a first integrated circuit device (e.g., an IC chip or die), and external resources 249 may be implemented or provided on one or more other devices (e.g., a circuit board and/or other IC device(s)). Data processing array 200 and external memory 250, or a portion thereof, may reside on the same IC device (e.g., die or chip), respective IC dies of an IC device or package, or on IC dies of separate IC devices or packages, which may reside on the same circuit board or separate circuit boards.

In the example of FIG. 2, data processing array 200 includes a plurality of circuit blocks, or tiles, illustrated here as compute tiles 202, interface tiles 204, and memory tiles 206. Memory tiles 206 may be referred to as shared memory and/or shared memory tiles. Interface tiles 204 may be referred to as shim tiles, and may be collectively referred to as an array interface 228. Further in the example of FIG. 2, external resources 249 include external memory 250, network-on-chip (NoC) circuitry 252, configurable circuitry, illustrated here as programmable logic (PL) 254, and a controller 256. External resources 249 may further include fixed logic circuitry and/or an application specific integrated circuit (ASIC).

Compute tile 202-4 includes one or more processing cores 208, program memory (PM) 210, data memory (DM) 212, DMA circuitry 214, and stream interconnect (SI) circuitry 216. Core(s) 208 execute program code stored in program memory 210. Core(s) 208 may include, without limitation, a scalar processor and/or a vector processor. Data memory 212 may be referred to herein as local memory or local data memory.

Core(s) 208 may directly access data memory 212 of compute tile 202-4 via DMA circuitry 214. Core(s) 208 may also access data memory of adjacent compute tiles 202 via DMA circuitry 214 and/or DMA circuitry of the adjacent compute tiles 202. Correspondingly, cores of adjacent compute tiles 202 may access data memory 212 of compute tile 202-4. Data memory 212 and data memory of adjacent compute tiles 202 may be presented to core(s) 208 as a unified region of memory (e.g., as a part of the data memory 212 of core compute tile 202-4). In an embodiment, core(s) 208 may access data memory of non-adjacent compute tiles 202. Permitting cores to access data memory of other compute tiles 202 may be useful to share data amongst the compute tiles 202.

Data processing array 200 may include direct core-to-core cascade connections (not shown) amongst compute tiles 202. Direct core-to-core cascade connections may include unidirectional and/or bidirectional direct connections. Core-to-core cascade connections may be useful to share data amongst cores of compute tiles 202 with relatively low latency (e.g., the data does not traverse stream interconnect circuitry 216, and the data does not need to be written to data memory of an originating compute tile and read by a recipient or destination compute tile 202). For example, a direct core-to-core cascade connection may be useful to provide results from an accumulation register of a processing core of an originating compute tile 202 directly to a processing core(s) of a destination compute tile 202.

In an embodiment, compute tiles 202 do not include cache memory. Omitting cache memory may be useful to provide predictable/deterministic performance. Omitting cache memory may also be useful to reduce processing overhead associated with maintaining coherency among cache memories across compute tiles 202.

In an embodiment, processing cores of compute tiles 202 do not utilize input interrupts. Omitting interrupts may be useful to permit the processing cores to operate uninterrupted. Omitting interrupts may also be useful to provide predictable/deterministic performance.

One or more compute tiles 202 may include special purpose or specialized circuitry, or may be configured as special purpose or specialized compute tiles such as, without limitation, digital signal processing engines, cryptographic engines, forward error correction (FEC) engines, and/or artificial intelligence (AI) engines.

In an embodiment, compute tiles 202, or a subset thereof, are substantially identically to one another (i.e., homogenous compute tiles). Alternatively, one or more compute tiles 202 may differ from one other more other compute tiles 202 (i.e., heterogeneous compute tiles).

Memory tile 206-1 includes memory 218 (e.g., random access memory or RAM), DMA circuitry 220, and stream interconnect (SI) circuitry 222.

Memory tile 206-1 may lack or omit computational components such as an instruction processor. In an embodiment, memory tiles 206, or a subset thereof, are substantially identical to one another (i.e., homogenous memory tiles). Alternatively, one or more memory tiles 206 may differ from one other more other memory tiles 206 (i.e., heterogeneous memory tiles). A memory tile 206 may be accessible to multiple compute tiles 202. Memory tiles 206 may thus be referred to as shared memory.

Data may be moved between/amongst memory tiles 206 via DMA circuitry 220 and/or stream interconnect circuitry 222 of the respective memory tiles 206. Data may also be moved between/amongst data memory 212 of a compute tile 202 and memory 218 of a memory tile 206 via DMA circuitry and/or stream interconnect circuitry of the respective tiles. For example, DMA circuitry 214 of compute tile 202-4 may read data from data memory 212 and forward the data to memory tile 206-1 in a write command, via stream interconnect circuitry 216 and stream interconnect circuitry 222. DMA circuitry 224 of memory tile 206-1 may then write the data to memory 218. As another example, DMA circuitry 220 of memory tile 206-1 may read data from memory 218 and forward the data to compute tile 202-4 in a write command, via stream interconnect circuitry 222 and stream interconnect circuitry 216, and DMA circuitry 214 of compute tile 202-4 may write the data to data memory 212.

Array interface 228 interfaces between data processing array 200 (e.g., compute tiles 202 and memory tiles 206) and external resources 249. Interface tile 204-1 includes DMA circuitry 224 and stream interconnect circuitry 226. Interface tiles 204 may be interconnected so that data may be propagated amongst interface tiles 204 another bi-directionally. An interface tile 204 may operate as an interface for column of compute tiles 202 (e.g., as an interface to one or more external resources 249). Interface tiles 204 may be connected such that data may be propagated from one interface tile 204 to another interface tile 204 bi-directionally.

In an embodiment, interface tiles 204, or a subset thereof, are substantially identically to one another (i.e., homogenous interface tiles). Alternatively, one or more interface tiles 204 may differ from one other more other interface tiles 204 (i.e., heterogeneous interface tiles).

In an embodiment, one or more interface tiles 204 is configured as a NoC interface tile (e.g., as master and/or slave device) that interfaces between compute tiles 202 and NoC 252 (e.g., to access external memory 250). In an embodiment, one or more other interface tiles 204 is configured as a PL interface that interfaces between compute tiles 202 and PL 254.

DMA circuitry and stream interconnect circuitry of data processing array 200 may be configurable/programmable to provide desired functionality and/or connections to move data between/amongst compute tiles 202, memory tiles 206, and external resources 249. The DMA circuitry and stream interconnect circuitry of data processing array 200 may include, without limitation, switches and/or multiplexers that are configurable to establish signal paths within, amongst, and/or between tiles of data processing array 200. Data processing array 200 may further include configurable AXI interface circuitry. The DMA circuitry, the stream interconnect circuitry, and/or AXI interface circuitry may be configured/programmed by storing configuration parameters in configuration registers, configuration memory (e.g., configuration random access memory or CRAM), and/or eFuses, and coupling read outputs of the configuration registers, CRAM, and/or eFuses to functional circuitry (e.g., to a control input of a multiplexer or switch), to maintain the functional circuitry in a desired configuration or state. In an embodiment, core(s) 208 of compute tiles 202 configure the DMA circuitry and stream interconnect circuitry of the respective compute tiles 202 based on core code 146 stored in program memory 210 of the respective compute tiles 202, and controller 256 configures DMA circuitry and stream interconnect circuitry of memory tiles 206 and interface tiles 204 based on controller code 148.

External memory 250 may include on-chip memory disposed on the same IC die as data processing array 200 or on another IC die within a common IC package (e.g., stacked IC dies or a set of IC dies/chiplets). Alternatively, or additionally, external memory 250 may include off-chip memory (e.g., mounted on a circuit board on which an IC device containing data processing array 200 is mounted. External memory 250 may include, without limitation, double data rate, synchronous, dynamic random access memory (DDR SDRAM).

Target computing platform 130 may include a hierarchical memory structure. For example, data memory 212 of compute tiles 202 may represent a first level (L1) of memory, memory 218 of memory tiles 206 may represent a second level (L2) of memory, and external memory 250 may represent a third level (L3) of memory. Memory capacity may progressively decrease with each level (e.g., memory 218 of compute tile 202-1 may have more storage capacity than data memory 212 of compute tile 202-4, and external memory 250 may have more storage capacity than data memory 212 of compute tile 202-4). The hierarchical memory structure is not, however, limited to the foregoing examples.

As an example, an input tensor may be relatively large (e.g., 1 megabyte or MB). Local data memory 212 may be significantly smaller (e.g., 64 kilobytes or KB). Controller 256 may segment an input tensor and store the segments in respective blocks of shared memory tiles 206.

Data flows defined by ML-ADF graph 110 may utilize the memory hierarchy of data processing array 200 and external memory 250. In implementing ML-ADF graph 110, data flows of the application may be defined using graph APIs 104. The data flows may occur between external memory 250 and one or more data memories 212 (e.g., compute tiles 202), between external memory 250 and one or more memory tiles 206, and/or between one or more memory tiles 206 and one or more data memories 212 (e.g., compute tiles 202). Graph APIs 104 may define additional objects that may be used to specify such data flows.

In an embodiment, machine readable code 120 includes code to configure target computing platform 130 for a first layer of the multi-layer tensor processing application, and code to reconfigure target computing platform 130 for each of one or more subsequent layers of the multi-layer tensor processing application.

In an embodiment, machine readable code 120 includes core code 146 for execution by compute tiles 202, or a subset thereof, and controller code 148 for controller 256. Core code 146 is stored in program memory 210 of the respective compute tiles 202. Core code 146 includes code to execute each of the layers of the multi-layer tensor processing application, and code to configure DMA circuitry 214 and/or stream interconnect circuitry 216 for each of the layers of the tensor processing application.

Figure 3:
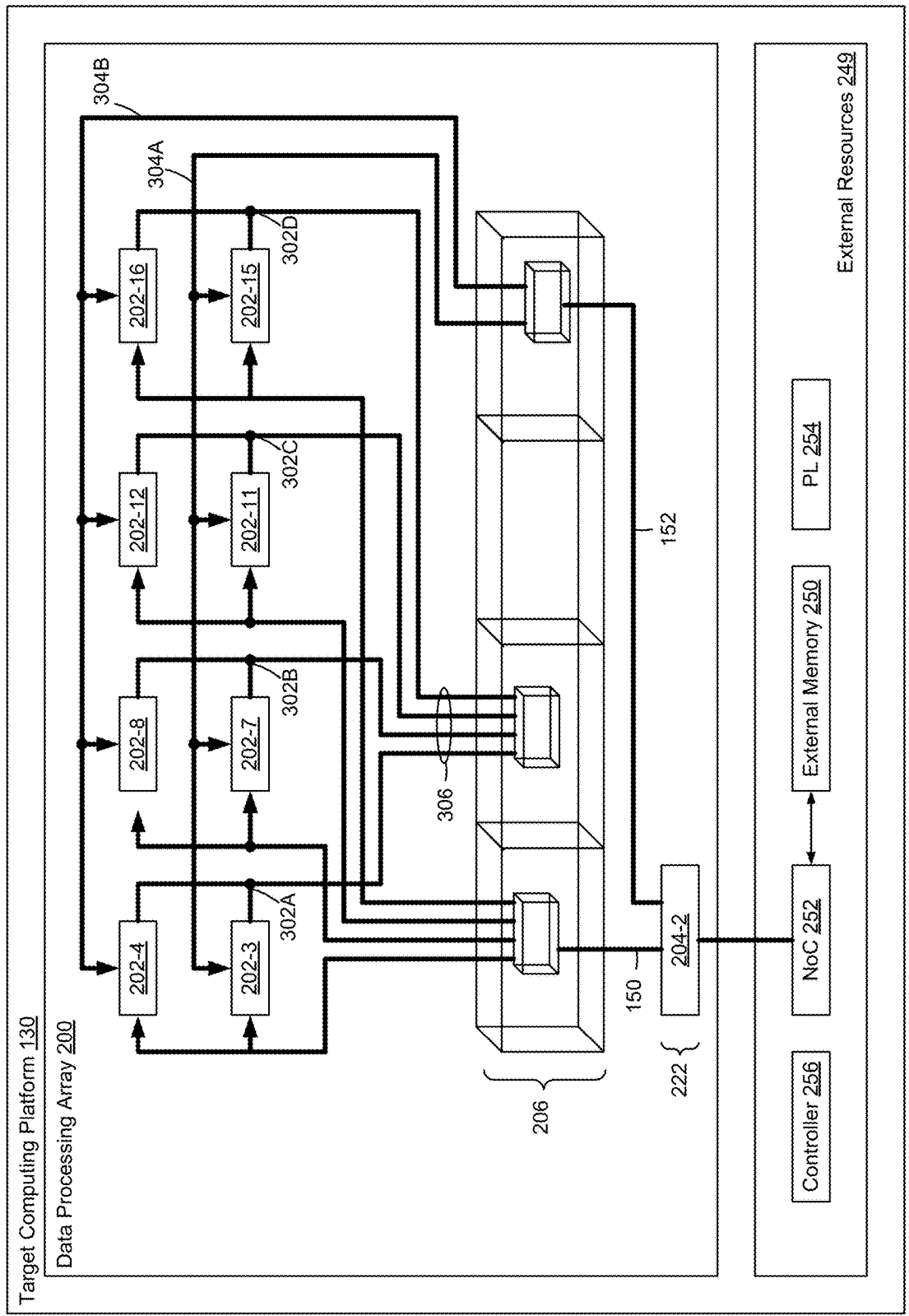
FIG. 3 is a schematic illustration of the target computing platform in a first configuration, according to an embodiment.
Figure 4:
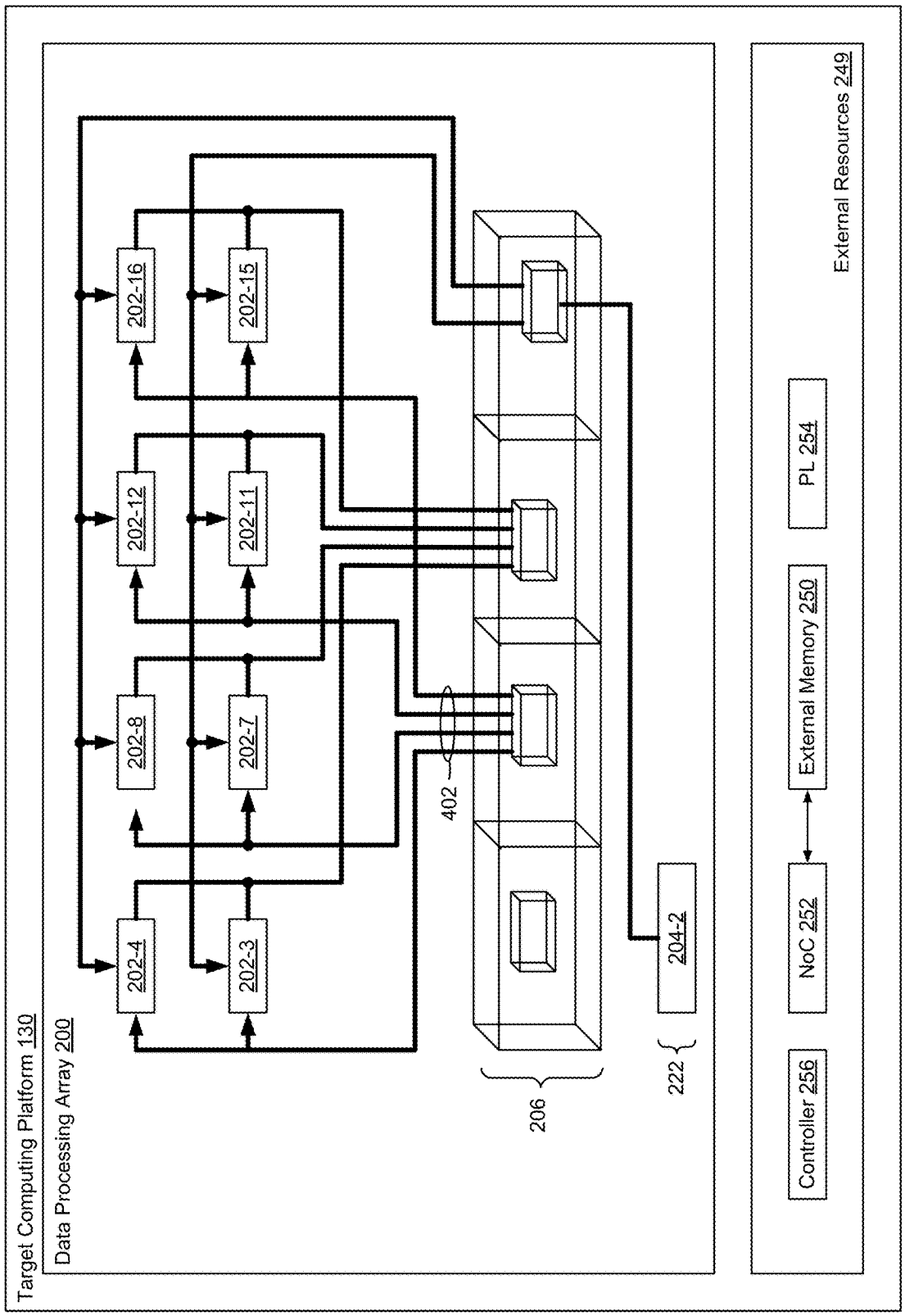
FIG. 4 is a schematic illustration of the target computing platform in a second configuration, according to an embodiment.

FIG. 3 is a schematic illustration of target computing platform 130 in a first configuration, according to an embodiment. FIG. 4 is a schematic illustration of target computing platform 130 in a second configuration, according to an embodiment. FIGS. 3 and 4 may correspond to first and second layers of multi-layer tensor processing application 101, and corresponding first and second layers of ML-ADF graph 110. FIGS. 3 and 4 may represent first and second layers of an object detection system known as Tiny YOLO (you only look once), version 2, such as described in examples further below.

ML-ADF graph 110 is now described. In conventional dataflow graphs, nodes are limited to computational nodes. Whereas development environment 102 provides a more expansive set of semantics (e.g., graph objects) and graph APIs 104 to encode multi-layer tensor processing application 101 as ML-ADF graph 110, and to map ML-ADF graph 110 to resources of target computing platform 130.

In multi-layer tensor processing application 101, computations may be represented as processing nodes, and data flow may be represented as edges or connections amongst the processing nodes. When mapping a layer of multi-layer tensor processing application 101 to target computing platform 130, compilation system 100 may represent the processing nodes as kernel objects (i.e., code to perform a computation), and edges as various types of data nodes or objects.

A kernel may implement one or more of a variety of functions. A function may be specific to a domain such as, without limitation, image processing, communications, cryptography, and/or machine learning. A kernel may be specified in a high-level programming language. A kernel may be custom-written for ML-ADF graph 110 or may be obtained from a kernel library.

A layer of ML-ADF graph 110 may include multiple kernels, and a subset of compute tiles 202 may be selected to execute respective kernels of the layer in parallel. An input/output buffer port of a kernel may represent a logical DMA channel (e.g., a logical s2 mm/mm2s DMA channel) for write/read access of a sub-volume stored in local tile data memory (L1) (i.e., local memory 308). An input/output cascade port of a kernel may represent cascade connections from/to the next kernel.

Data nodes or objects may include buffer objects that represent various levels of the memory hierarchy, and ports that represent configurable interconnections amongst elements of target computing platform 130. Buffer objects may include, without limitation, an external buffer object corresponding to external memory 250, a shared memory object corresponding to memory tiles 206, and buffer object corresponding to data memory 212 of compute tiles 202. Data nodes or objects are not limited to external buffers and shared buffers. Other buffer types may be defined/utilized based on a memory hierarchy of a target computing platform. Data nodes or objects may, for example, be defined for other resources/circuitry of target computing platform 130, such as other external resources 149. Data nodes or objects may be useful to permit a developer to specify specific/desired data flows amongst processing nodes/kernels (i.e., amongst compute tiles 202 and various levels of the memory hierarchy).

A shared buffer may represent a logical tensor stored in shared memory tiles 206, and may be modeled as a data node in ML-ADF graph 110. An input/output port of a shared buffer may represent a logical DMA channel (e.g., logical s2 mm/mm2s DMA channel) in a shared memory tile for write/read access to the logical tensor.

An external buffer may represent a logical tensor stored in external memory 250, and may be modeled as a data node in ML-ADF graph 110. An input/output port of an external buffer may represent a logical DMA channel (e.g., a logical s2 mm/mm2s DMA channel) in an interface tile 204 for write/read access to the logical tensor.

A directional connection may represent data flow of tensors (or tiled sub-volumes of memory tiles 206) between kernels and buffer objects. A directional connection may be modeled as a directed edge in ML-ADF graph 110.

ML-ADF graph 110 may specify a number of compute tiles 202 and/or a number of blocks of shared memory tiles 206 to allocate for execution of a layer.

ML-ADF graph 110 may include tiling parameters that specify read and write access patterns (e.g., tensor tiling, sub-volume traversal, zero-padding, etc.) for a shared buffer (i.e., memory tiles 206) and external buffer posts (i.e., external memory 250), using a relatively high level of abstraction.

ML-ADF graph 110 may include absolute and/or relative location constraints to guide compiler 106 when folding and mapping ML-ADF graph 110 to resources of target computing platform 130. Folding and mapping are discussed further below. Example location constraints include kernel to compute tile, kernel port to compute tile DMA channel, kernel port buffer to compute tile local data memory, shared buffer to memory tile, shared buffer port to memory tile DMA channel, and external buffer port to shim/interface DMA channel. Location constraints may permit temporal sharing and/or spatial sharing of resources of target computing platform 130 to be specified, explicitly or relatively.

Machine readable code 120 may include compiled versions of kernels, a mapping of the kernels to compute tiles 202, a mapping of data nodes to multi-dimensional tensors and/or data derived therefrom (e.g., sub-volumes of a tensor, input feature maps provided to compute tiles 202, and output feature maps generated by compute tiles 202), a mapping of buffer objects to respective levels of the memory hierarchy and/or other resources (e.g., external resources 149), and/or configuration parameters/data (e.g., for DMA circuitry 214) for each layer of multi-layer tensor processing application 101.

Compiler 106 is now described. Compiler 106 may utilize existing compiler flow techniques and semantics in combination with one or more multi-layer adaptive data flow techniques and semantics disclosed herein. Compiler 106 may utilize existing programming syntax to represent data or tensor flow semantics for each layer of ML-ADF graph 110. In the example of FIG. 1, compiler 106 includes a graph folder 140, a scheduler 142, and a mapper and router 144.

Graph folder 140 folds ML-ADF graph 110 to an overlay graph that maps features of ML-ADF graph 110 to resources of target computing platform 130 (i.e., core(s) 208, data memory 212, memory tiles 206, DMA channels, cascade connections, and routing network). Graph folding may be achieved by fully specified location constraints or by heuristics or design space exploration with partially specified location constraints. The folded overlay graph is then provided to mapper and router 144 to compute routing configurations, which may be fixed throughout the entirety of ML-ADF graph 110.

Graph folder 140 permits temporal sharing of platform resources across layers of ML-ADF graph 110. For example, ML-ADF graph 110 may include 18 layers, each having 8 parallel kernels. Rather than using 8×18=144 compute tiles 202, graph folder 140 may fold ML-ADF graph 110 to a 4×2 array of compute tiles 202 that are temporally shared amongst the layers.

Figure 5:
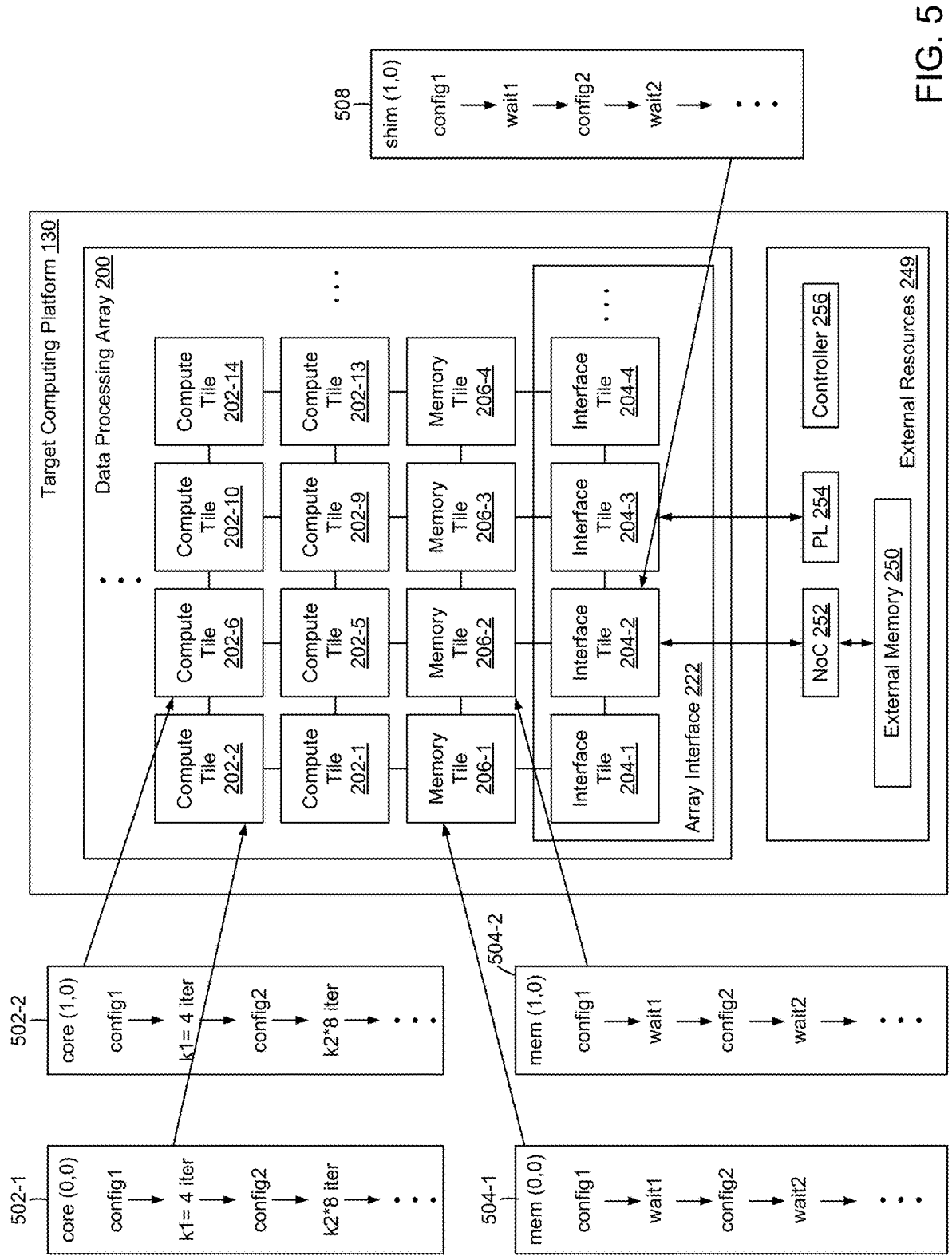
FIG. 5 is a block diagram of the target computing platform and associated schedules, according to an embodiment.

Scheduler 142 computes schedules based on data flow dependency, control flow dependency, and any specified resource constraints. FIG. 5 is a block diagram of target computing platform 130 and associated schedules, according to an embodiment. In the example of FIG. 5, the schedules include compute tile schedules 502-1 and 502-2 for compute tiles 202-2 and 202-6, respectively. The schedules further include shared memory schedules 504-1 and 504-2 for memory tiles 206-1 and 206-2, respectively. The schedules further include a shim schedule 508 for interface tile 204-2.

A schedule may be defined as a looped schedule $S = L_1 L_2 \ldots L_N$, where each schedule loop $L_i = (n\ T_1 T_2 \ldots T_m)$ is defined as the successive repetition n times of the invocation sequence $T_1 T_2 \ldots T_m$, and each $T_j$ is either an atomic schedule element or a hierarchically nested schedule loop. An atomic schedule element may include one or more of the following actions: kernel invocation, kernel buffer port initialization, buffer descriptor (BD) configuration, enqueuing DMA channel task, lock initialization, lock acquire, lock release, wait for task complete token, wait for DMA channel task queue, and wait for DMA channel completion.

For each compute tile 202 to be used, scheduler 142 computes kernel execution order and kernel repetition counts for the kernels folded to the same compute tile. Scheduler 142 may statically allocate and share resources of compute tiles 202 (e.g., data memory, DMA channels, buffer descriptors, and locks) across multiple layers. Scheduler 142 may also compute DMA configurations and lock synchronization for enabling data movement to and from compute tiles 202, layer by layer. The execution sequence of the aforementioned activities may be represented in the looped schedule format for each compute tile.

Resources allocated for layers of ML-ADF graph 110 may differ amongst the layers. For example, addresses for data memories 212 of compute tiles 202 and sizes for input feature maps (IFMs), output feature maps (OFMs), and weight sub-volumes may differ amongst the layers. In an embodiment, each compute tile 202 configures its own local registers using a core processor bus from a core program stored in program memory 210.

Scheduler 142 may also compute a schedule for controller 256 to reconfigure memory tiles 206 and interface tiles (e.g., DMA circuitry 224) for orchestrating tensor and sub-volume movement within and across layers of graph 122. Scheduler 142 may statically allocate and share memory tile resources (e.g., shared memory, DMA channels, buffer descriptors, and locks) and resources of interface tiles 204 (e.g., DMA channels and buffer descriptors). Scheduler 142 may compute DMA configurations and lock synchronization in a looped schedule format. As noted further above, resources allocated for layers of ML-ADF graph 110 may differ amongst the layers. For example, memory tile shared memory addresses and sizes for an input feature map, an output feature map, and weights tensors may differ amongst the layers.

Based on the computed schedules, compiler 106 generates core code 146 for selected compute tiles 202 and controller code 148 for controller 256. Controller code 148 may cause controller 256 to perform synchronization functions, reconfigure memory tiles 206, and reconfigure DMA registers of interface tiles 204.

Program memory 210 may be relatively small (e.g., 16 KB), and may be shared amongst kernel functions and core code 146. For scalability, core code 146 should not increase linearly with the number of layers of ML-ADF graph 110. Program memory optimization techniques may be employed to parameterize layer-dependent schedule elements into data memory, while keeping program memory size constant for the generated control program.

In an embodiment, target computing platform 130 has multiple target options for controller 256 to compute tiles 202, including programmable logic and a processing subsystem (e.g., an advanced reduced instruction set computer (RISC) machine (ARM) processor subsystem), and multiple external control mechanisms (e.g., an Axi-MM and control packets). This embodiment of target computing platform 130 may be referred to as an adaptive computer acceleration platform (ACAP). In this example, the schedule for controller 256 may remain the same for different controller targets, and compiler 106 generates re-targetable control code by linking to target-specific implementation.

Additional examples are provided below with respect to the object detection system Tiny YOLO, v2. Tiny YOLO v2 applies a single neural network to a full image. The neural network divides the image into regions and predicts bounding boxes and probabilities for each region. The bounding boxes are weighted by the predicted probabilities. Tiny YOLO v2 has 9 layers. In examples herein, the layers are folded to a 4×2 overlay graph (e.g., a 4×2 set of compute tiles 202-2, 202-6, 202-10, 202-14, 202-1, 202-5, 202-9, and 202-13).

FIGS. 6A-6D illustrate example source code for the first layer of Tiny YOLO v2, according to an embodiment. FIGS. 6E-6H illustrate example source code for the second layer of Tiny YOLO v2, according to an embodiment. In FIGS. 6A-6H, the variable i is a column index for data processing array 200, and j is a row index.

Figure 7A:
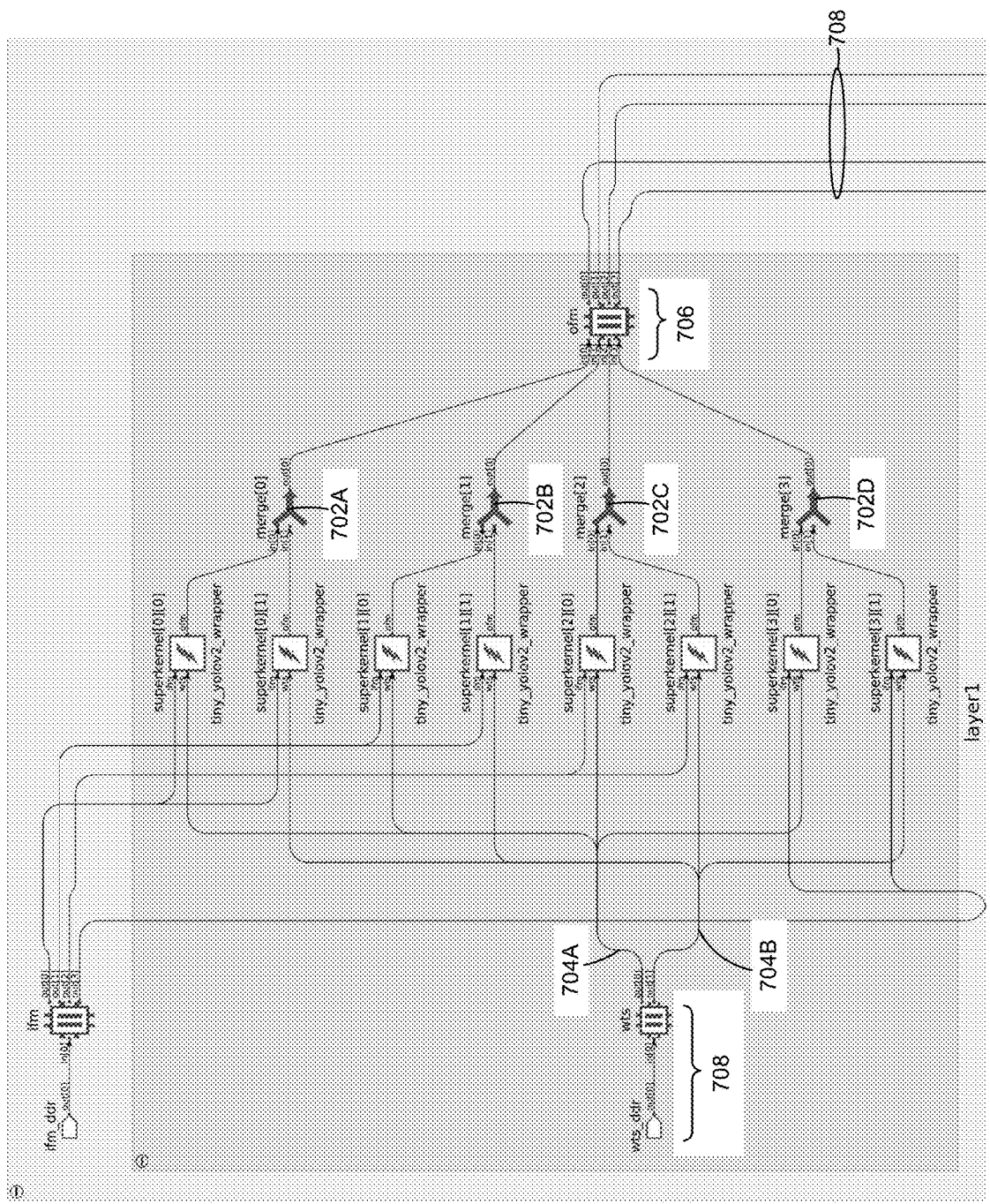
FIG. 7A is a graphical depiction of the source code for the first layer of Tiny YOLO, v2 (i.e., corresponding to FIGS. 6A-6D), according to an embodiment.
Figure 7B:
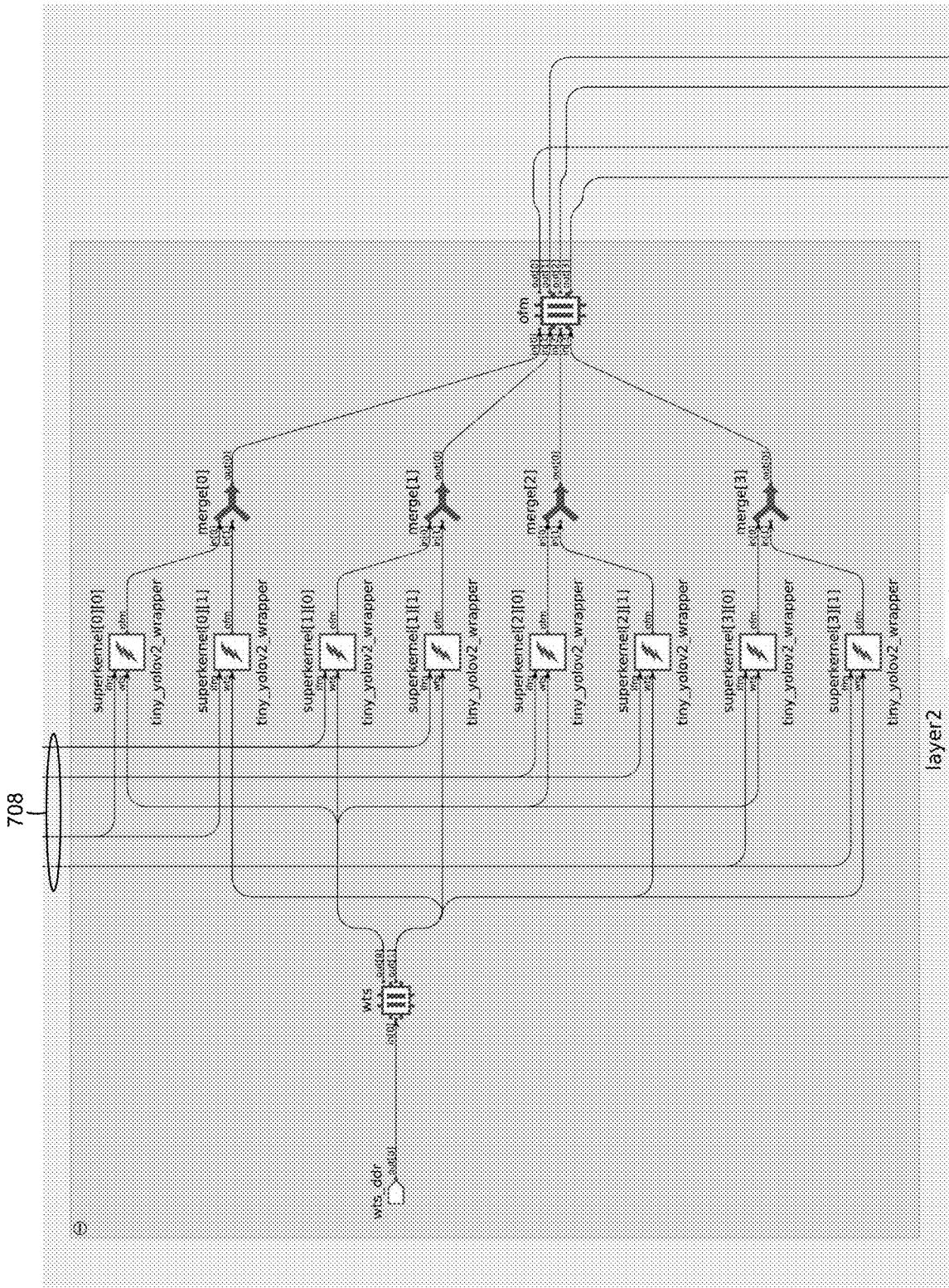
FIG. 7B is a graphical depiction of the source code for the second layer of Tiny YOLO, v2 (i.e., corresponding to FIGS. 6E-6H), according to an embodiment.
Figure 7C:
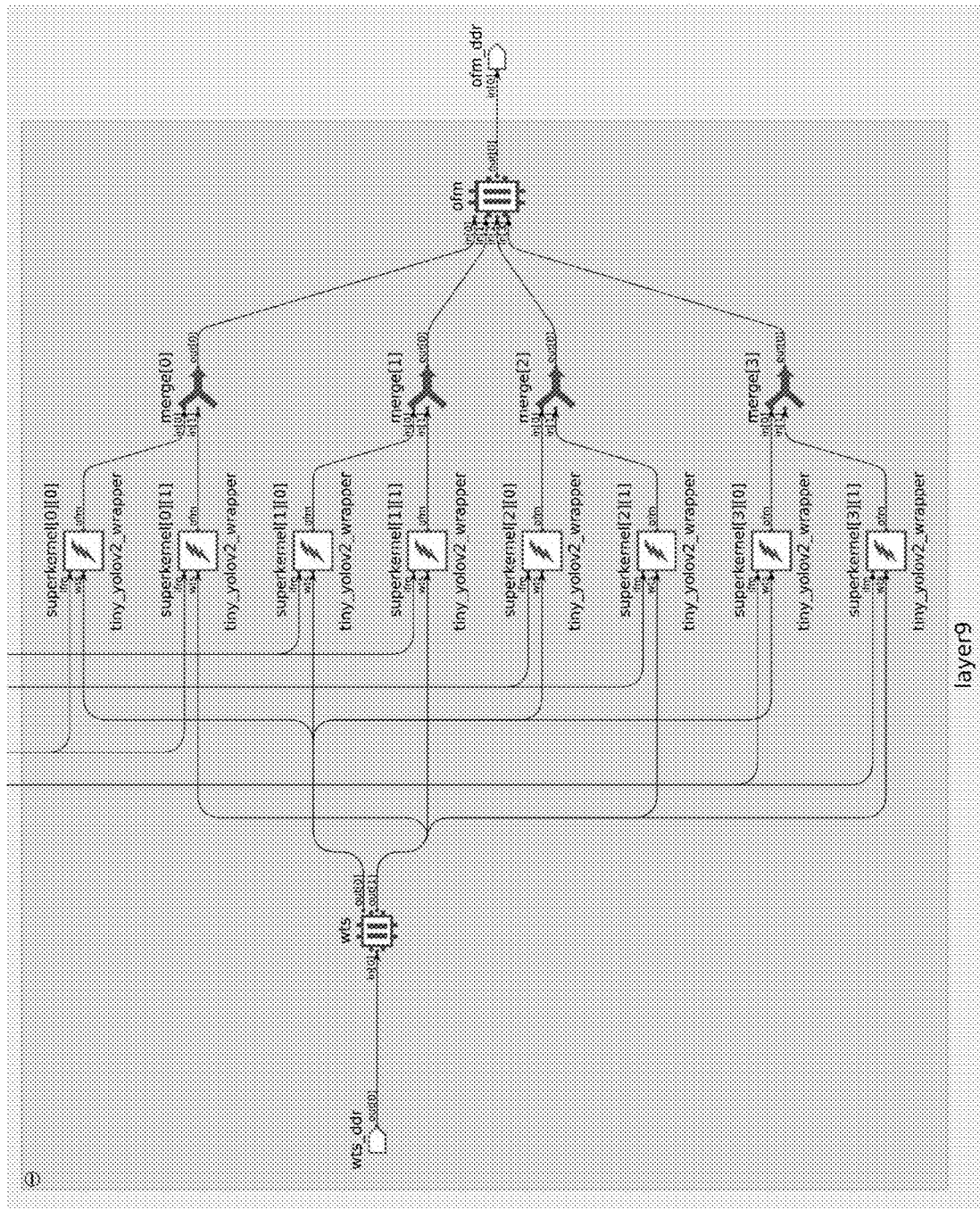
FIG. 7C is a graphical depiction of source code for a ninth layer of Tiny YOLO, v2, according to an embodiment.

FIG. 7A is a graphical depiction of the source code for the first layer of Tiny YOLO, v2 (i.e., corresponding to FIGS. 6A-6D), according to an embodiment. FIG. 7B is a graphical depiction of the source code for the second layer of Tiny YOLO, v2 (i.e., corresponding to FIGS. 6E-6H), according to an embodiment. FIG. 7C is a graphical depiction of source code for the ninth layer of Tiny YOLO, v2, according to an embodiment.

FIGS. 6A-6H and 7A-7C represent examples of ML-ADF graph 110. The graphical depictions of FIGS. 7A and 7B may be generated from the source code depicted in FIGS. 6A-6H. Alternatively, the source code depicted in FIGS. 6A-6H may be generated from the graphical depictions of FIGS. 7A and 7B.

Figure 8:
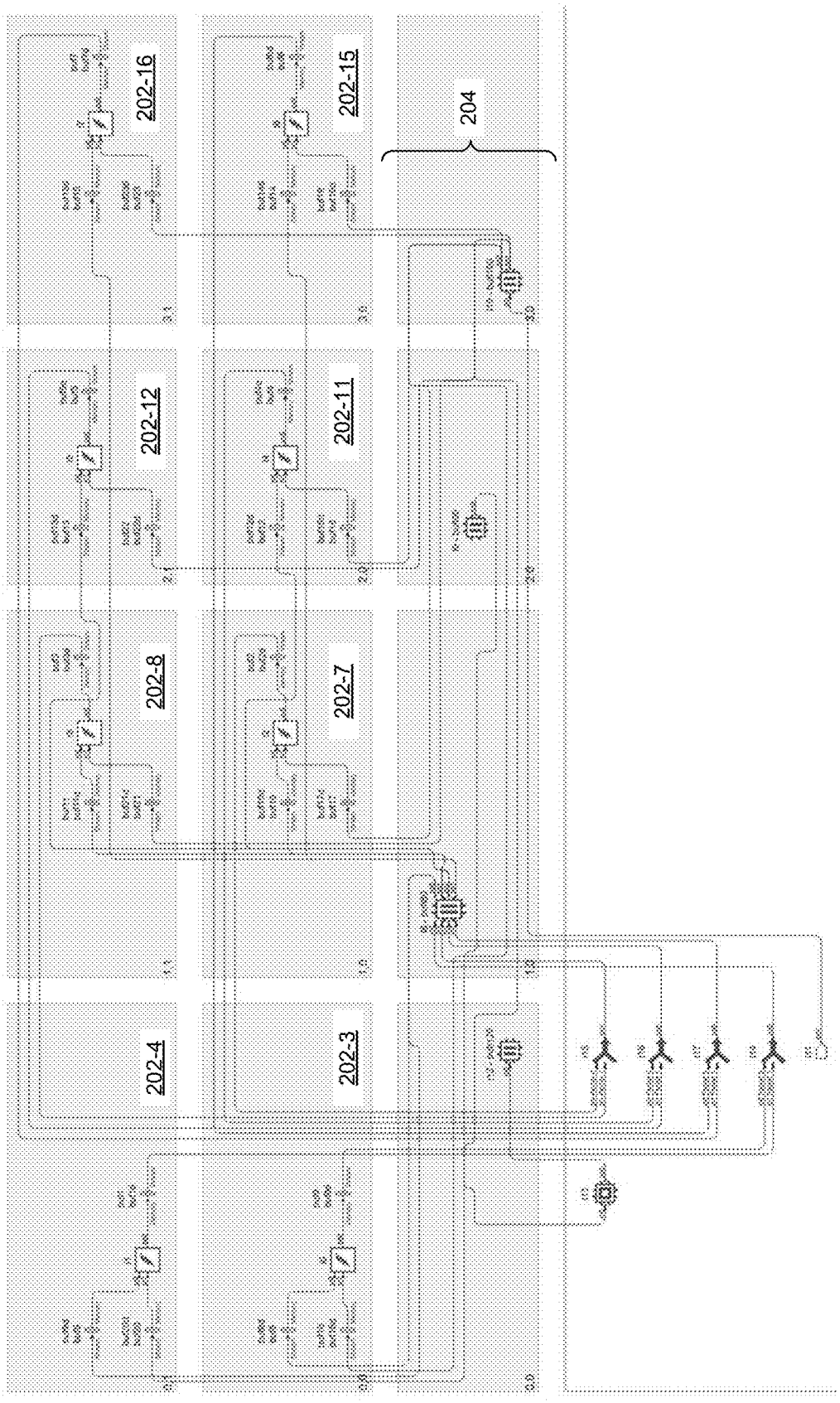
FIG. 8 depicts an overlay graph for Tiny YOLO v2 (i.e., a physical view of Tiny YOLO v2 folded onto the target computing platform), according to an embodiment.

FIG. 8 depicts an overlay graph 800 for Tiny YOLO v2 (i.e., a physical view of Tiny YOLO v2 folded onto target computing platform 130), according to an embodiment. Overlay graph 800 may be generated by graph folder 140 (FIG. 1) based on the source code depicted in FIGS. 6A-6H and/or based on the graphical depiction of FIGS. 7A-7C. Mapper and router 144 (FIG. 1), may perform mapping and routing based on overlay graph 800.

FIG. 9 depicts a schedule 900 for a compute tile 202, based on Tiny YOLO v2, according to an embodiment.

FIG. 10 depicts a schedule 1000 of tasks to be performed by controller 256 with respect to interface tiles 204 and memory tiles 206, based on Tiny YOLO v2, according to an embodiment.

Figure 11:
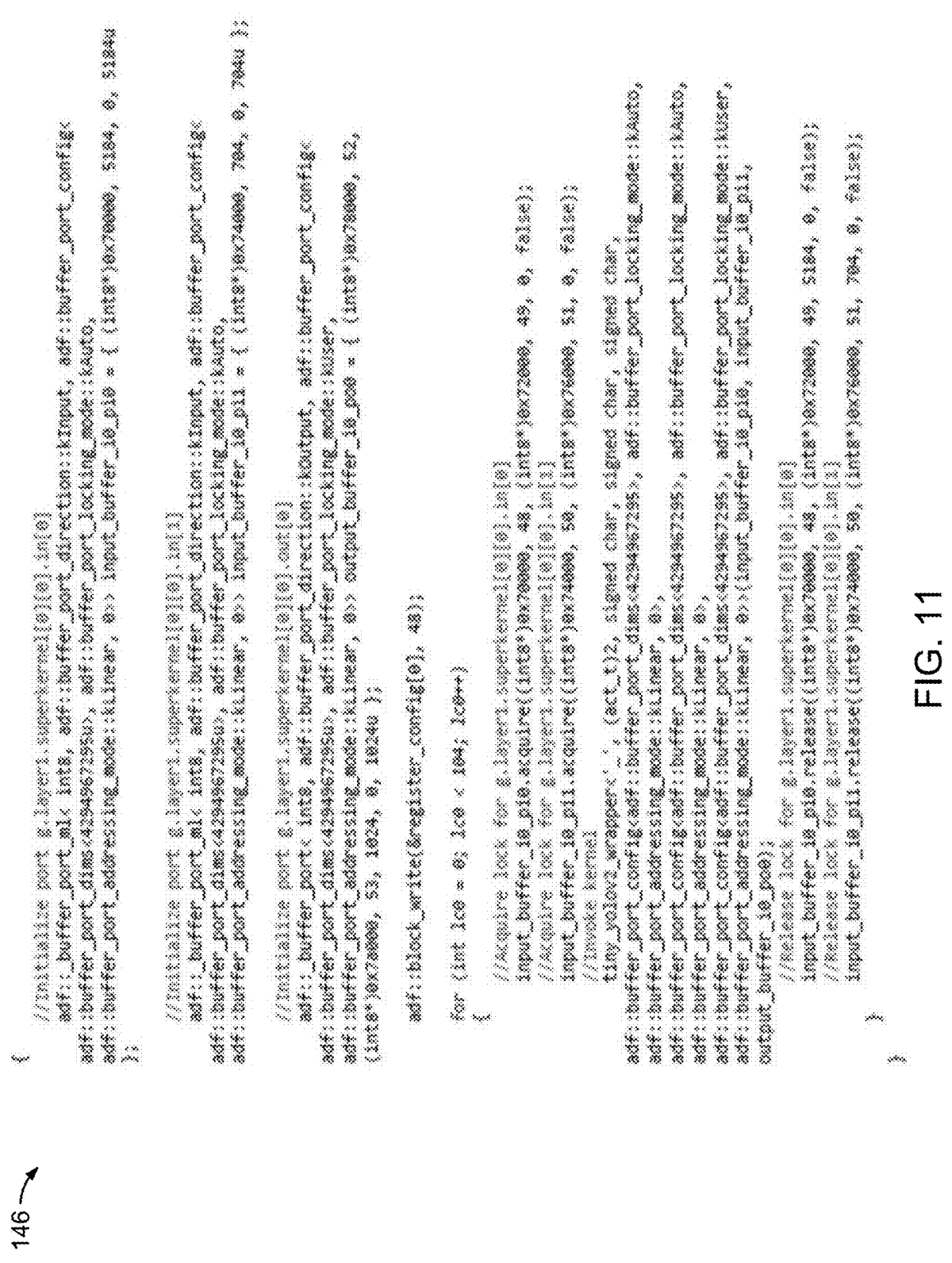

FIG. 11 depicts core code 146 generated by compiler 106 for Tiny YOLO v2, according to an embodiment.

FIGS. 12-15 depict controller code 148 generated by compiler 106 for Tiny YOLO v2, according to an embodiment.

Selected aspects/features of FIGS. 6A-6H and 7A-7C are discussed below.

In FIG. 6A, at 602, the source code specifies that a 4×2 array of 8 kernels is to be used (e.g., compute tiles 202-4, 202-8, 202-12, 202-16, 202-3, 202-7, 202-11, and 202-15 in FIG. 3).

At 604, the source code declares various objects/parameters.

At 606, the source code defines an iterative process to construct the 8 kernels (an outer loop having 4 iterations and an inner loop having 2 iterations), and specifies a superkernel object to use (i.e., superkernel[i][j]=kernel:: create (tiny_yolov2_wrapper<1,LRELU,int8,int8,int8, bpc_sync_1d,bpc_sync_1d,bpc_a sync_1d>).

The iterative process includes a repetition count (i.e., a number to times to run the superkernel object in order to process the layer). In this example, the superkernel object is to be repeated 104 times. In an embodiment, tensor 150 (FIG. 1) is divided into sub-volumes, and the sub-volumes are provided to 8 compute tiles 202 to be processed in parallel. Each of the 8 compute tiles 202 processes 104 sub-volumes in order to fully process the layer. Different sub-volumes may be processed with each iteration, or the same sub-volumes may be processed repeatedly, using different weights.

The iterative process further includes a kernel location constraint that specifies a physical location (i.e., array tile i,j). The kernel location constraint indicates that the logical superkernel object is to be mapped to the specified physical tile. The kernel location constraint may be user-imposed constrain. Alternatively, compilation system 100 may determine where to map the logical superkernel object. The kernel location constraint is parameterized in that the location does not necessarily start from i,j=0,0. Rather, it may be offset.

The iterative process further includes a location constraint to keep a stack or heap area in local data memory of compute tile i,j at address 0xe800.

After the loop is fully iterated, the superkernel is created and provided with attributes.

In FIG. 6B, at 608, the source code specifies a shared buffer (i.e., corresponding to memory tiles 206) for an output feature map (i.e., an output tensor or sub-volume), having a dimension of 8×256×2×8, 4 input ports, and 4 output ports. The ports will be mapped to a DMA channel.

At 610, the source code specifies a shared buffer for a weight tensor having a dimension of 1408, 1 input port, and 2 output ports. The weight tensor may represent a weight or coefficient for a filter operation of a convolution operation. The weight tensor may be viewed as data to be provided to the kernel.

At 612, the source code specifies location buffers for the output feature map and the weight tensor in memory tiles 206. Here, the output feature map is located in a memory tile 206 located at column 1, row 0, at address 167936+1024, and the weight tensor is located in a memory tile 206 at column 3, row 0, with address offset 0 in the memory tile.

At 614, the source code sets up connections to broadcast weights to the compute tiles 202. This is illustrated at 704A and 704B in FIG. 7A, and at 304A and 304B in FIG. 3.

In FIG. 6C, at 616, the source code specifies a logical stream merge network of outputs of compute tiles 202 of each column. This is illustrated at 702A-702D in FIG. 7A, and at 302A-302D in FIG. 3.

At 618, the source code sets up connections to store results from the merged stream to an input DMA channel of memory tiles 206. This is illustrated at 706 in FIGS. 7A, and at 306 in FIG. 3.

In FIG. 6D, at 620, the source code allows the output feature map of layer 1 to be passed in as an input feature map of layer 2. This is illustrated at 708 in FIGS. 7A and 7B, and at 402 in FIG. 4.

Regarding weight tensors. ML-ADF graph 110 may have many layers (e.g., 50 layer, up to 100 layers, or more). It may not be feasible to an entire weight tensor in memory tiles 206. In an embodiment, a logical graph object is provided for each layer to represent the weights for that layer in external memory 250. An output port connects the weight shared buffer input port to bring the weights for the layer from external memory 250 to shared memory tiles 206. This is illustrated at 622 in FIG. 6B, at 708 in FIG. 7A, and at 152 in FIG. 3.

In FIG. 6B, at 624 and 626, the source code indicates which DMA channel to use to bring weights from external memory 250 into shared memory (i.e., memory tiles 206). The DMA channel may represent an interface tile 204 configured as a DMA interface. In the example of FIG. 6B, 624 specifies a weight output port (of interface tiles 204) at column 3, channel 0, and 626 specifies a weight input port (of memory tiles 206) at column 3, channel 0. The DMA channel specifications at 624 and 626 may be referred to as DMA constraints.

ML-ADF graph 110 may specify read and/or write access parameters, such as when a multi-dimensional tensor (e.g., input feature map and/or weight tensor) is segmented into sub-volumes (e.g., to accommodate memory capacity constraints of memory tiles 206 and/or data memory 212 of compute tiles 202).

In FIG. 6B, at 628, the source code provides read and write instructions to move a weight tensor from external memory 250 to a memory tile 206. Here, a buffer dimension and a tiling dimension are the same, indicating that the weight tensor is to be moved in its entirety (i.e., without tiling/segmenting).

At 630 (FIG. 6B), the source code provides a read instruction that includes tiling parameters to provide a first portion of the weight tensor (i.e., having a tiling dimension of 704 and zero offset) to a first row of the selected set of compute tiles 202, and to provide a second portion of the weight tensor (i.e., having a tiling dimension of 704 and an offset of 704) to a second row of the selected set of compute tiles 202. In this example, the weight tensor may be viewed as a one dimensional tensor that is divided in half. The read instruction indicates that it is to be repeated 104 times.

In FIG. 6D, at 632, the source code includes read instructions related to the use of the output feature map of layer 1 as the input feature map of layer 2 (see, 620 described further above). The read instructions at 632 include dimension, tiling, and traversal parameters. The buffer dimension (i.e., the real or full tensor) is {4, 416, 1, 416}, which is to be segmented with a tile dimension size of {8, 36, 1, 18} and an offset of {0, −1+32*1, 0, −1}.

A tiled portion of the tensor may extend beyond its buffer. The portion that extends beyond the buffer may be zero-padded.

Traversal parameters of the read instructions at 632 specify traversing a dimension 3 of the input feature map in strides or jumps of 16, with a wrap (i.e., total number of steps) of 2, and traversing dimension 1 of the input feature map in strides or jumps of 32*4, with a wrap of 2.

Figure 16:
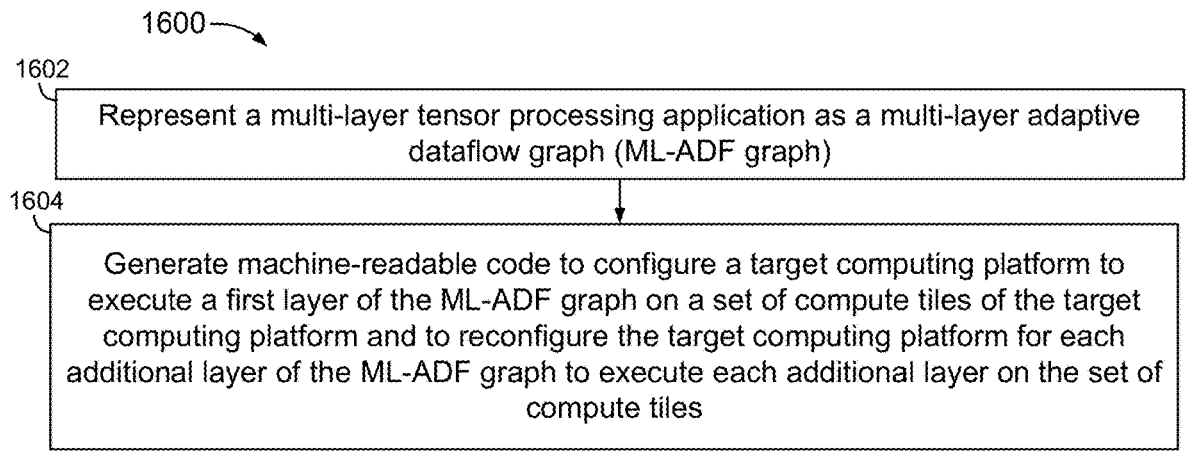
FIG. 16 is a flowchart of a method of encoding a multi-layer tensor processing application as machine-readable code for a target computing platform, according to an embodiment.

FIG. 16 is a flowchart of a method 1600 of encoding a multi-layer tensor processing application as machine-readable code for a target computing platform, according to an embodiment. Method 1600 is described below with reference to compilation system 100 and target computing platform 130. Method 1600 is not, however, limited to the examples of compilation system 100 and target computing platform 130.

At 1602, development environment 102 represents multi-layer tensor processing application 101 as ML-ADF graph 110.

At 1604, compilation system 100 generates machine readable code 120 to configure target computing platform 130 to execute a first layer of ML-ADF graph 110 on a set of compute tiles 202, and to reconfigure target computing platform 130 for each additional layer of ML-ADF graph 110 to execute each additional layer of ML-ADF graph 110 on the set of compute tiles.

Figure 17:
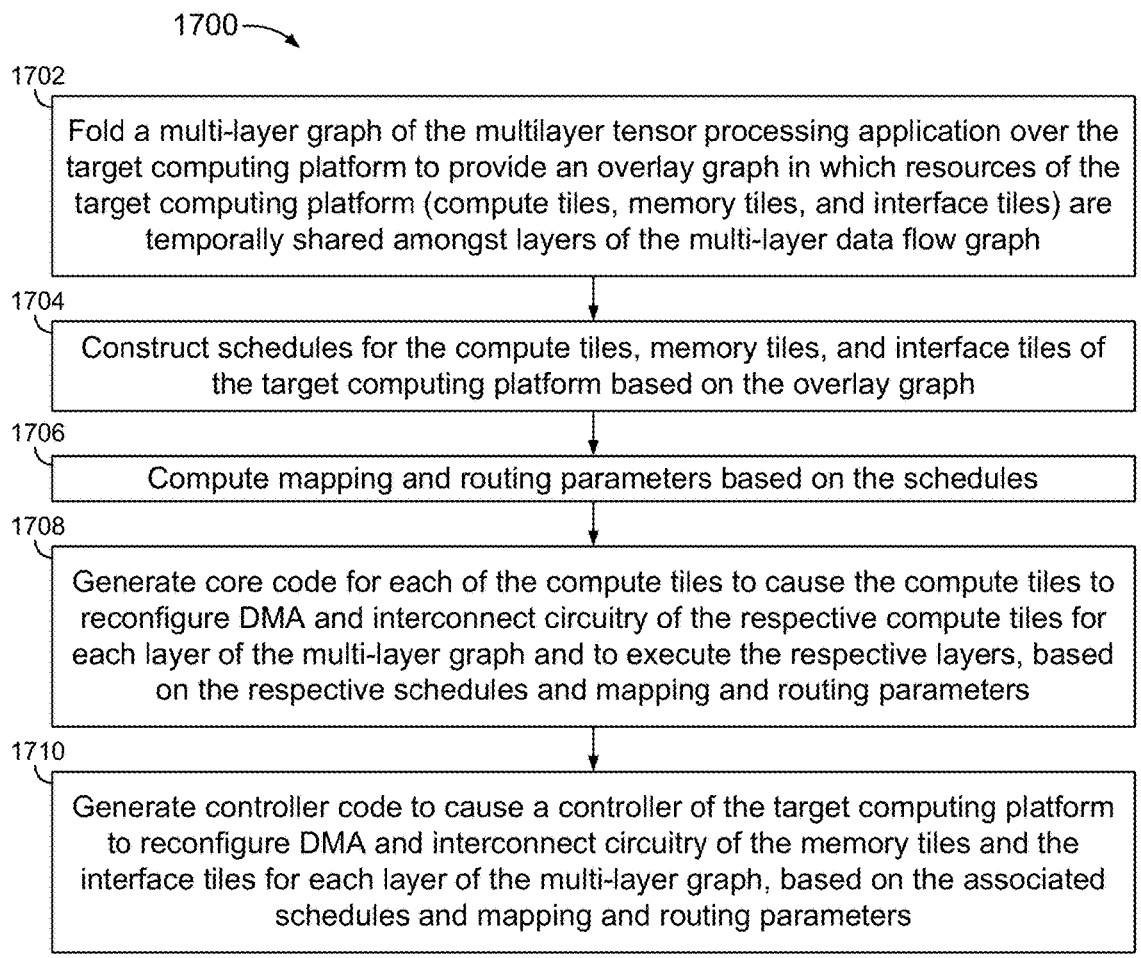
FIG. 17 is a flowchart of a method of encoding a machine-readable abstract representation of a multi-layer tensor processing application as machine-readable code for a target computing platform, according to an embodiment.

FIG. 17 is a flowchart of a method 1700 of encoding a machine-readable abstract representation of a mum-layer tensor processing application as machine-readable code for a target computing platform, according to an embodiment. Method 1700 is described below with reference to compilation system 100 and target computing platform 130. Method 1700 is not, however, limited to the examples of compilation system 100 and target computing platform 130.

At 1702, graph folder 140 folds ML-ADF graph 110 over target computing platform 130 to provide overlay graph 152 in which resources of target computing platform 130 (e.g., a selected set of compute tiles 202, memory tiles 206, and interface tiles 204) are temporally shared amongst layers of ML-ADF graph 110.

At 1704, scheduler 142 constructs schedules 154 for compute tiles 202, memory tiles 206, and interface tiles 204 based on overlay graph 152.

At 1706, mapper and router 144 computes mapping and routing parameters 156 based on schedules 154.

At 1708, compiler 106 generates core code 146 for each of the selected compute tiles 202 based on the respective schedules and mapping and routing parameters, to cause the selected compute tiles 202 to reconfigure DMA and interconnect circuitry of the respective compute tiles 202 (e.g., DMA circuitry 214 and stream interconnect circuitry 216) for each layer of ML-ADF graph 110 and to execute the respective layers.

At 1710, compiler 106 generates controller code 148 based on the associated schedules and mapping and routing parameters, to cause controller 256 of target computing platform 130 to reconfigure DMA and interconnect circuitry of memory tiles 206 (e.g., DMA circuitry 220 and stream interconnect circuitry 222) and DMA and interconnect circuitry of interface tiles 204 (e.g., DMA circuitry 224 and stream interconnect circuitry 226) for each layer of ML-ADF graph 110.

Figure 18:
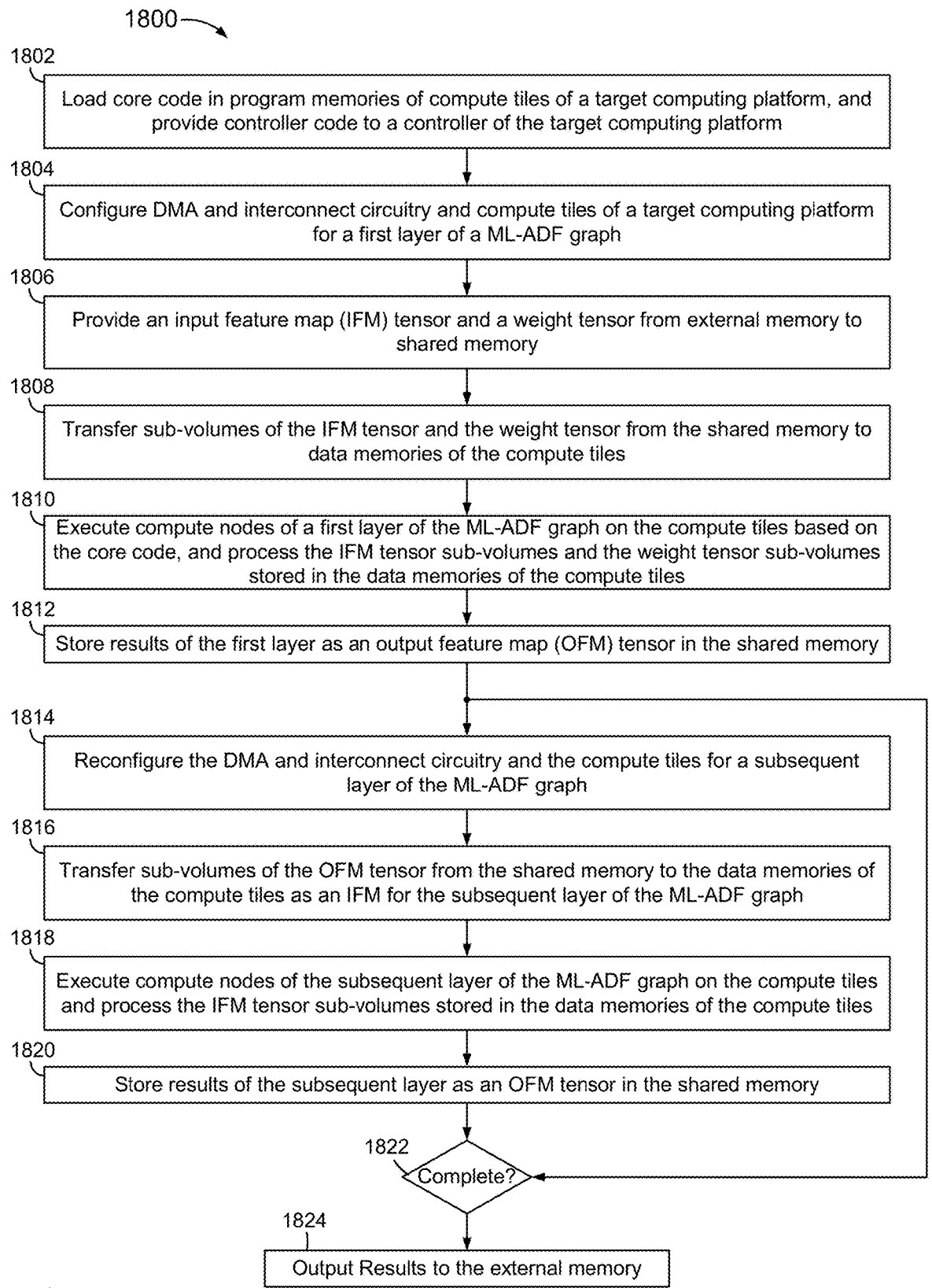
FIG. 18 is a flowchart of a method of executing a multi-layer tensor processing application on a target computing platform, according to an embodiment.

FIG. 18 is a flowchart of a method 1800 of executing a multi-layer tensor processing application on a target computing platform, according to an embodiment. Method 1800 is described below with reference to compilation system 100 and target computing platform 130. Method 1800 is not, however, limited to the examples of compilation system 100 and target computing platform 130.

At 1802, core code 146 is loaded in program memories 210 of selected compute tiles 202 of target computing platform 130, and controller code 148 is provided to controller 256 of target computing platform 130. The remainder of method 1800 may be performed by core(s) 208 based on core code 146, and by controller 256 based on controller code 148.

At 1804, interconnect circuitry of target computing platform 130 is configured for a first layer of ML-ADF graph 110. The configuring may include configuring DMA circuitry 214, 220, and 224, and stream interconnect circuitry 216, 222, and 226.

At 1806, an input feature map (IFM) tensor and a weight tensor is provided from external memory 250 to shared memory (i.e., memory tiles 206) via interface tile 204-2.

At 1808, sub-volumes of the IFM tensor and sub-volumes of the weight tensor are distributed from shared memory to data memories 212 of the selected compute tiles 202.

At 1810, compute nodes of a first layer of ML-ADF graph 110 are executed on the selected compute tiles 202 based on core code 146 stored in program memory 210 of the selected compute tiles 202, and based on the IFM tensor sub-volumes and weight tensor sub-volumes stored in data memory 212. The compute nodes may be executed in parallel and/or in a pipelined fashion.

At 1812, results of the first layer are stored in shared memory (i.e., memory tiles 206) as an output feature map (OFM) tensor. Results of multiple compute tiles 202 may be merged (e.g., on a column basis). In an embodiment, the results or a portion thereof may be stored in external memory 250.

In an embodiment 1808, 1810, and 1814 are repeated until all sub-volumes of the IFM tensor and/or weight tensor are processed.

The compute nodes may be executed in an iterative or respective fashion, in which additional sub-volumes of the IFM tensor and/or weight tensor are provided from the shared memory to the compute tiles and respective results are stored in shared memory to form the OFM.

At 1814, the interconnect circuitry of target computing platform 130 is re-configured for a second or subsequent layer of ML-ADF graph 110. The re-configuring may include re-configuring DMA circuitry 214 and 220 and stream interconnect circuitry 216 and 222. The re-configuring may further include re-configuring DMA circuitry 224 214 and stream interconnect circuitry 226 of interface tile 204-2 (e.g., to retrieve another IFM tensor and/or weight tensor from external memory 250).

At 1816, sub-volumes of the OFM tensor of the preceding layer and sub-volumes of the weight tensor are distributed from the shared memory to data memories 212 of the selected compute tiles 202 as an IFM for the subsequent layer of the ML-ADF graph.

At 1818, compute nodes of the subsequent layer of the ML-ADF graph are executed on the selected compute tiles based on core code 146 stored in program memory 210 of the selected compute tiles 202, and based on the IFM tensor sub-volumes and weight tensor sub-volumes stored in data memory 212. The compute nodes may be executed in parallel and/or in a pipelined fashion.

At 1820, results of the subsequent layer are stored in shared memory (i.e., memory tiles 206) as an OFM tensor. Results of multiple compute tiles 202 may be merged (e.g., on a column basis). In an embodiment, the results or a portion thereof may be stored in external memory 250.

In an embodiment 1816, 1818, and 1820 are repeated until all sub-volumes of the IFM tensor and/or weight tensor are processed.

The compute nodes may be executed in an iterative or respective fashion, in which additional sub-volumes of the IFM tensor and/or weight tensor are provided from the shared memory to the compute tiles and respective results are stored in shared memory to form the OFM.

At 1822, when processing of ML-ADF graph 110 is complete, results may be output from shared memory to external memory 250 at 1824.

In an embodiment, one or more layers of ML-ADF graph 110 are processed without a weight tensor.

Figure 19:
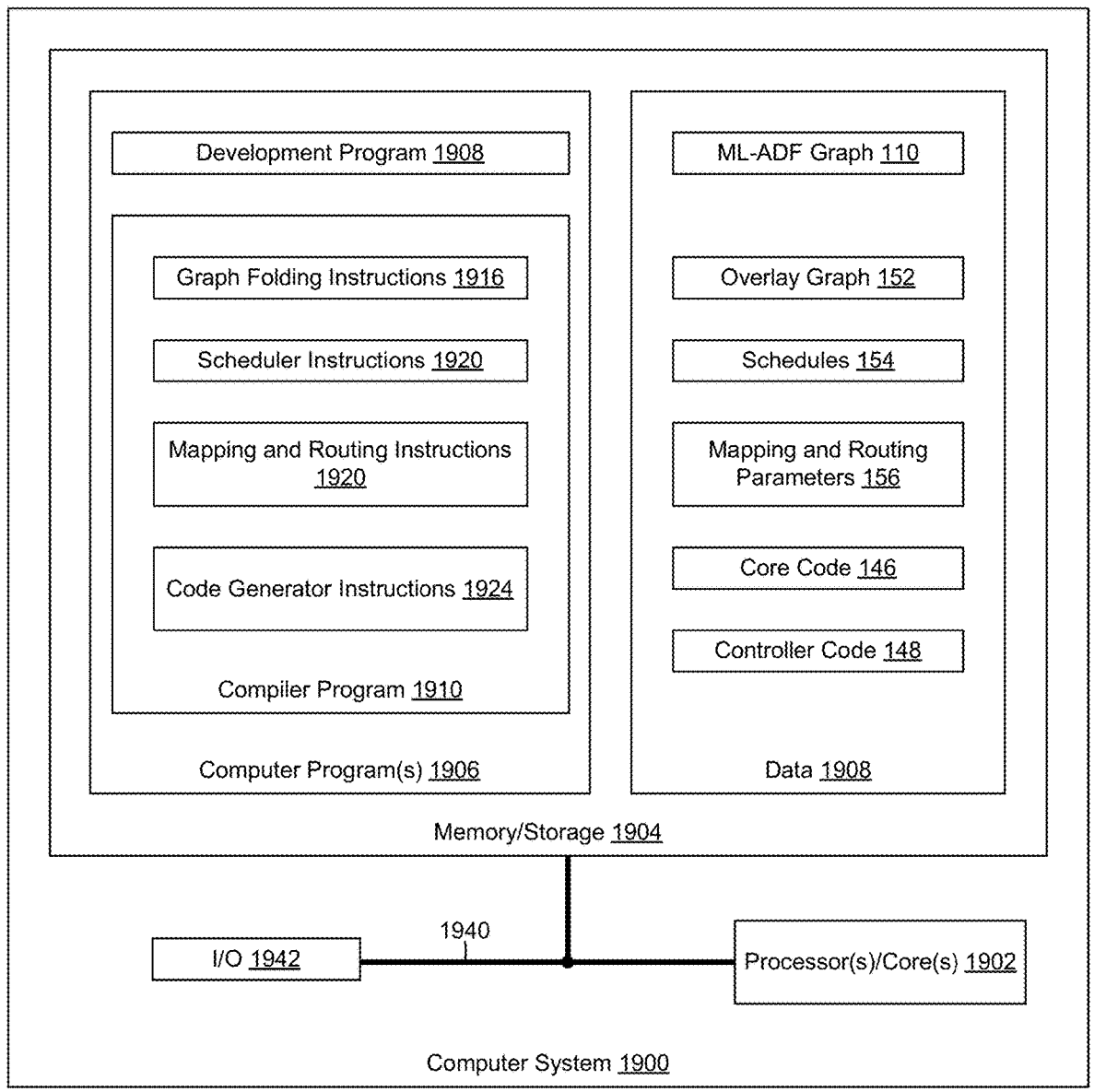
FIG. 19 a block diagram of a computer system that compiles a machine-readable abstract representation of a multi-layer tensor processing application for a target computing platform, according to an embodiment.

FIG. 19 a block diagram of a computer system 1900 that compiles a machine-readable abstract representation of a multi-layer tensor processing application for a target computing platform, according to an embodiment. Computer system 1900 may represent an example embodiment or implementation of compiler system 100 in FIG. 1.

Computer system 1900 includes one or more instruction processors, illustrated here as a processor 1902, that executes instructions of computer programs 1906 encoded within a computer-readable medium, illustrated here as memory/storage 1904. Memory/storage 1904 further includes data 1908, which may be used by processor 1902 during execution of computer programs 1906, and/or generated by processor 1902 during execution of computer programs 1906. Memory/storage 1904 may include a transitory or non-transitory computer-readable medium.

In the example of FIG. 19, computer programs 1906 include a development program 1908 that causes processor 1902 to represent multi-layer tensor processing application 101 as ML-ADF graph 110.

Computer programs 1906 further include a compiler program 1910 that causes processor 1902 to compile ML-ADF graph 110 for target computing platform 130. Compiler program 1910 includes graph folding instructions 1916 that cause processor 1902 to fold ML-ADF graph 110 to target computing platform 130 to provide overlay graph 152, such as described in one or more examples above.

Compiler program 1910 further includes scheduler instructions 1920 that cause processor 1902 to generate schedules 154, such as described in one or more examples above.

Compiler program 1910 further includes code generator instructions 1924 that cause processor 1902 to generate core code 146 and controller code 148, such as described in one or more examples above.

Computer system 1900 further includes communications infrastructure 1940 to communicate amongst devices and/or resources of computer system 1900.

Computer system 1900 further includes one or more input/output (I/O) devices and/or controllers 1942 that interface with one or more other systems, such as to provide core code 146 and controller code 148 to target computing platform 130.

Computer system 1900 may enable specification of:
parallel computing kernels for each layer of ML-ADF graph 110;
storage of tensors across a shared memory hierarchy;
tensor tiling and sub-volume distribution; and/or
temporal and spatial sharing of resources.

Figure 20:
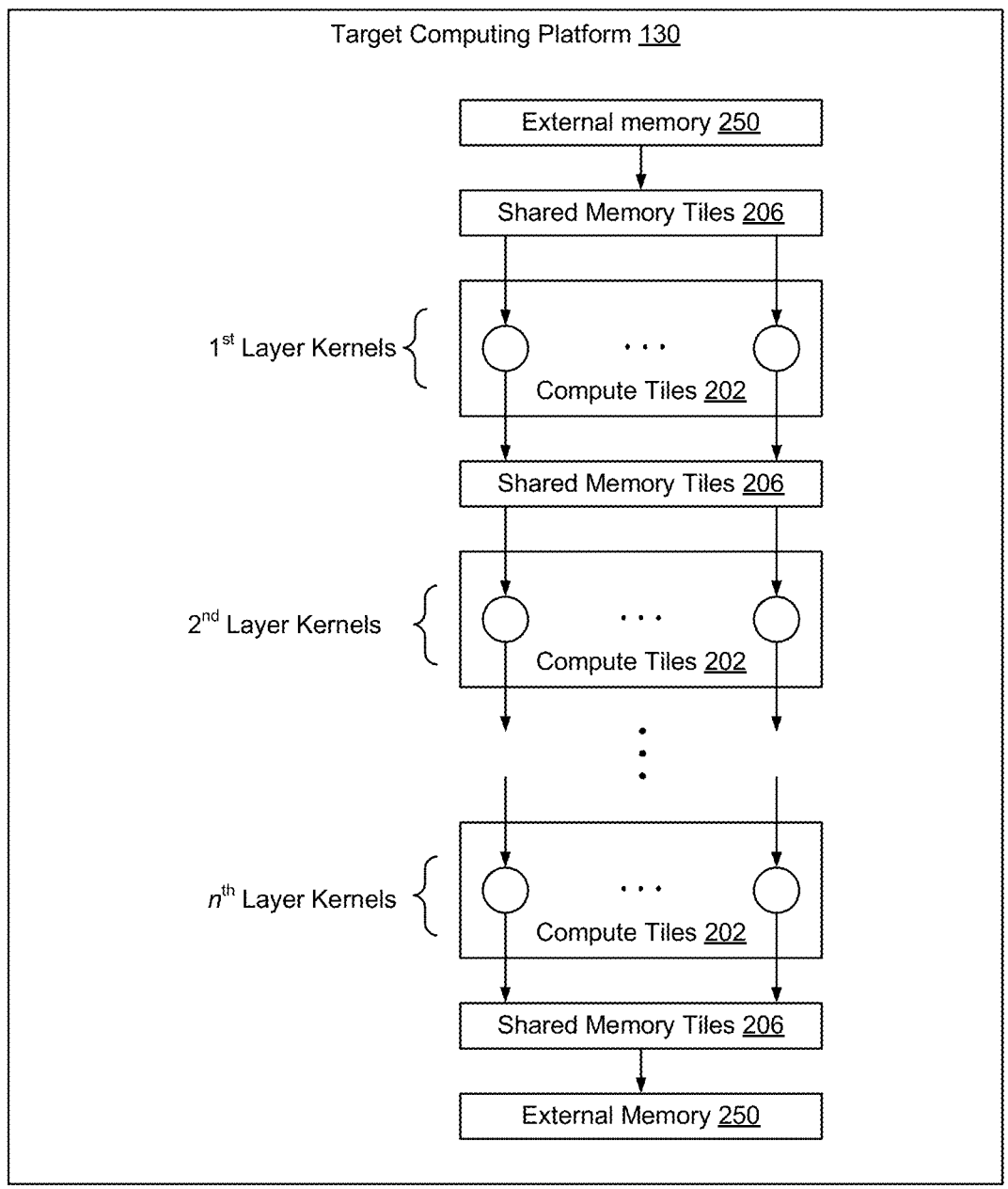
FIG. 20 is a conceptual illustration of tensor flow through the target computing platform, according to an embodiment.

FIG. 20 is a conceptual illustration of tensor flow through target computing platform 130, according to an embodiment.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A machine-implemented method, comprising:
receiving a multi-layer adaptive data flow (ML-ADF) graph specifying an application for execution on a data processing array (DPA) that comprises data processing elements (DPEs) and local, shared, and external memories;
folding the ML-ADF graph onto the DPA to provide an overlay graph, wherein the overlay graph represents the DPEs and the local and shared memories, and wherein resources of the DPA are temporally shared amongst multiple layers of the ML-ADF graph;
constructing DPE schedules for compute nodes of the ML-ADF graph and a data transfer schedule corresponding to shared-data and external-data nodes of the ML-ADF graph in order to coordinate runtime execution of the layers of the ML-ADF graph by the DPEs and sharing of data amongst the layers of the ML-ADF graph through the shared and external memories;
generating DPE code for the DPEs based on the respective DPE schedules; and
generating controller code for controllers and data movers of the local, shared and external memories based on the data transfer schedule.

2. A non-transitory computer readable medium encoded with a computer program that comprises instructions to cause a processor to:
receive a multi-layer adaptive data flow (ML-ADF) graph specifying an application for execution on a data processing array (DPA) that comprises data processing elements (DPEs) and local, shared, and external memories;
fold the ML-ADF graph onto the DPA to provide an overlay graph, wherein the overlay graph represents the DPEs and the local and shared memories, and wherein resources of the DPA are temporally shared amongst multiple layers of the ML-ADF graph;

construct DPE schedules for compute nodes of the ML-ADF graph and a data transfer schedule corresponding to shared-data and external-data nodes of the ML-ADF graph in order to coordinate runtime execution of the layers of the ML-ADF graph by the DPEs and sharing of data amongst the layers of the ML-ADF graph through the shared and external memories;

generate DPE code for the DPEs based on the respective DPE schedules; and generate controller code for controllers and data movers of the local, shared and external memories based on the data transfer schedule.

3. An apparatus, comprising:

a processor and memory configured to, represent a multi-layer tensor processing application as a multi-layer adaptive data flow (ML-ADF) graph, and generate machine-readable code to configure a target computing platform to execute a first layer of the ML-ADF graph on compute tiles of the target computing platform, and to reconfigure the target computing platform for each additional layer of the ML-ADF graph to execute each additional layer of the ML-ADF graph on the compute tiles;

wherein the target computing platform comprises a data processing array and resources external to the data processing array;

wherein the data processing array comprises the compute tiles, memory tiles, and interface tiles;

wherein the compute tiles comprise processing cores, data memory, program memory, and configurable direct memory access (DMA) circuitry and interconnect circuitry;

wherein the memory tiles comprise memory, configurable DMA circuitry, and configurable interconnect circuitry;

wherein the interface tiles comprise configurable DMA circuitry and configurable interconnect circuitry;

wherein the resources external to the data processing array comprise external memory and controller circuitry; and wherein the machine-readable code comprises core code to cause the compute tiles to configure the DMA circuitry and the interconnect circuitry of the compute tiles for each layer of the ML-ADF graph, and controller code to cause the controller circuitry to reconfigure the DMA circuitry and the interconnect circuitry of the memory tiles and the interface tiles for each layer of the ML-ADF graph.

4. The apparatus of claim 3, wherein the processor and memory are further configured to represent the multi-layer tensor processing application as the ML-ADF graph by:

representing multi-dimension data storage and data movement through a memory hierarchy that includes the external memory, the memory tiles, and the data memory of the compute tiles, using data nodes and connections amongst the data nodes;

representing tensor processing of a layer of the ML-ADF graph as data flow through the data nodes and distribution to the compute tiles across the memory hierarchy;

representing data flow amongst layers of the ML-ADF graph using connections amongst data nodes of the respective layers; and representing multi-dimension data partitioning and distribution using tiling parameters associated with ports of the data nodes.

5. The apparatus of claim 3, wherein the processor and memory are further configured to generate the machine-readable code to configure the target computing platform to:

execute kernels of a layer of the ML-ADF graph in parallel;

share tensors amongst layers of the ML-ADF graph through the memory tiles;

distribute sub-volumes of the tensors amongst the compute tiles;

temporally share the compute tiles and the memory tiles amongst the layers of the ML-ADF graph; and spatially share the memory tiles amongst the compute tiles within the layers of the ML-ADF graph.

6. The apparatus of claim 3, wherein the processor and memory are further configured to generate the machine-readable code by:

folding the ML-ADF graph over the target computing platform to provide an overlay graph in which resources of the target computing platform are temporally shared amongst the layers of ML-ADF graph;

constructing schedules for the compute tiles, the memory tiles, and the interface tiles based on the overlay graph and the ML-ADF graph;

computing mapping and routing parameters based on the overlay graph;

generating the core code for the compute tiles based on the respective schedules and the mapping and routing parameters to cause the compute tiles to reconfigure the DMA circuitry and the interconnect circuitry of the compute tiles for each layer of the ML-ADF graph and to execute the respective layers; and generating the controller code based on the schedules and mapping and routing parameters to cause the controller circuitry to reconfigure the DMA circuitry and the interconnect circuitry of the memory tiles and the DMA circuitry and the interconnect circuitry of the interface tiles for each layer of ML-ADF graph.

7. The apparatus of claim 3, wherein:

the controller code comprises code to cause the controller circuitry to configure the DMA circuitry and the interconnect circuitry of the memory tiles and the DMA circuitry and the interconnect circuitry of the interface tiles to provide a tensor from the external memory to the memory tiles and to provide sub-volumes of the tensor from the memory tiles to the compute tiles as an input feature map for the first layer of the ML-ADF graph;

the core code comprises code to cause the compute tiles to configure the DMA circuitry and the interconnect circuitry of the compute tiles to store the sub-volumes in the data memory, execute the first layer of the ML-ADF graph to process the sub-volumes, and provide results to the memory tiles as an output feature map; and the controller code further comprises code to cause the controller circuitry to configure the DMA circuitry and the interconnect circuitry of the memory tiles to store the output feature map in the memory tiles and to provide sub-volumes of the output feature map from the memory tiles to the compute tiles as an input feature map for a second layer of the ML-ADF graph.

8. The apparatus of claim 7, wherein the machine-readable code further comprises code to configure DMA circuitry and interconnect circuitry of the target computing platform to gather the results of multiple compute tiles based on connectivity and filing parameters in the ML-ADF graph, and to provide merged results to the memory tiles as the output feature map.

9. The apparatus of claim 7, wherein the controller code further comprises code to cause the controller circuitry to segment the tensor into the sub-volumes based on tiling parameters of the ML-ADF graph, and wherein the tiling parameters comprise a tensor dimension parameter, a sub-volume dimension parameter, an offset parameter, and a traversal parameter.

10. The apparatus of claim 3, wherein the ML-ADF graph comprises:
 a first buffer object type that represents the data memory of the compute tiles;
 a second buffer object type that represents the memory tiles; and
 a third buffer object type that represents the external memory.

11. The apparatus of claim 3, wherein the processor and memory are further configured to permit a user to specify a constraint in the ML-ADF graph to cause the processor and memory to perform one or more of:
 map compute nodes of the ML-ADF graph to user-specified compute tiles;
 map a shared buffer data node of the ML-ADF graph to a user-specified region of the memory tiles;
 map a port of a compute node of the ML-ADF graph to a user-specified DMA channel of the target computing platform;
 map a buffer of a port of a compute node of the ML-ADF graph to the data memory of a user-specified compute tile
 map a port of a shared memory object of the ML-ADF graph to a user-specified DMA channel of the memory tiles; and
 map an external buffer port of the ML-ADF graph to a user-specified DMA channel of the interface tiles.

12. The apparatus of claim 3, wherein the processor and memory are further configured to permit a user to specify a subset of the compute tiles to be used for respective layers of the ML-ADF graph.

13. An integrated circuit (IC) device, comprising:
 a computing platform comprising compute tiles and memory tiles, wherein the computing platform is configured to execute compute nodes of a first layer of a multi-layer tensor processing application on the compute tiles, and to execute compute nodes of each additional layer of the multi-layer tensor processing application on the compute tiles, including to,
  execute the compute nodes of each layer of the multi-layer tensor processing application on the compute tiles in parallel,
  share tensors amongst layers of the multi-layer tensor processing application through memory tiles,
  distribute sub-volumes of the tensors amongst the compute tiles,
  temporally share the compute tiles and the memory tiles amongst the layers of the multi-layer tensor processing application, and
  spatially share the memory tiles amongst the compute tiles within the layers of the multi-layer tensor processing application.

14. The IC device of claim 13, wherein the computing platform comprises a data processing array and resources external to the data processing array, wherein the data processing array comprises the compute tiles, the memory tiles, and interface tiles to interface with the resources external to the data processing array, wherein the resources external to the data processing array comprise controller circuitry and external memory, and wherein:
 the compute tiles are configured to configure direct memory access (DMA) circuitry and interconnect circuitry of the compute tiles for each of the layers of the multi-layer tensor processing application; and
 the controller circuitry is configured to configure DMA circuitry and interconnect circuitry of the memory tiles and the interface tiles for each layer of the multi-layer tensor processing application.

15. The IC device of claim 13, wherein the computing platform comprises a data processing array and memory external to the data processing array, wherein the data processing array comprises the compute tiles, the memory tiles, and interface tiles, and wherein the computing platform is further configured to:
 configure the compute tiles, the memory tiles and the interface tiles to provide an input feature map (IFM) tensor and a weight tensor from the external memory to the memory tiles, transfer sub-volumes of the IFM tensor and sub-volumes of the weight tensor from the memory tiles to data memory of the compute tiles, execute compute nodes of the first layer of the multi-layer tensor processing application on the compute tiles based on the sub-volumes of the IFM tensor and the sub-volumes of the weight tensor stored in the data memory of the compute tiles, and store outputs of the compute tiles as an output feature map (OFM) tensor of the first layer in the memory tiles; and
 re-configure the compute tiles, the memory tiles and the interface tiles to transfer sub-volumes of an OFM tensor of a preceding layer of the multi-layer tensor processing application from the memory tiles to the data memory of the compute tiles, transfer a weight tensor of a subsequent layer of the multi-layer tensor processing application from the external memory to the memory tiles, transfer sub-volumes of the weight tensor from the memory tiles to the data memory of the compute tiles, execute compute nodes of the subsequent layer of the multi-layer tensor processing application on the compute tiles to process the sub-volumes of the OFM tensor of the preceding layer stored in the data memory of the compute tiles, store outputs of the compute tiles as an OFM tensor of the subsequent layer in the memory tiles, and transfer the OFM tensor of the subsequent layer to the external memory.

16. A method, comprising:
 executing a multi-layer tensor processing application on a computing platform, wherein the computing platform comprises compute tiles, and wherein the executing comprises,
  configuring the computing platform to execute compute nodes of a first layer of the multi-layer tensor processing application on the compute tiles, and
  re-configuring the computing platform to execute compute nodes of each additional layer of the multi-layer tensor processing application on the compute tiles;
 wherein the computing platform further comprises memory tiles, and wherein the executing further comprises,
  executing the compute nodes of each layer of the multi-layer tensor processing application on the compute tiles in parallel, sharing tensors amongst the layers of the multi-layer tensor processing application through the memory tiles, distributing sub-volumes of the tensors amongst the compute tiles;

temporally sharing the compute tiles and the memory tiles amongst the layers of the multi-layer tensor processing application, and spatially sharing the memory tiles amongst the compute tiles within the layers of the multi-layer tensor processing application.

17. A method, comprising:

executing a multi-layer tensor processing application on a computing platform, wherein the computing platform comprises compute tiles, and wherein the executing comprises, configuring the computing platform to execute compute nodes of a first layer of the multi-layer tensor processing application on the compute tiles, and re-configuring the computing platform to execute compute nodes of each additional layer of the multi-layer tensor processing application on the compute tiles;

wherein the computing platform further comprises a data processing array and memory external to the data processing array, wherein the data processing array comprises the compute tiles, memory tiles, and interface tiles;

wherein the configuring comprises configuring the compute tiles, the memory tiles and the interface tiles to provide an input feature map (IFM) tensor and a weight tensor from the external memory to the memory tiles, transferring sub-volumes of the IFM tensor and sub-volumes of the weight tensor from the memory tiles to data memory of the compute tiles, executing the compute nodes of the first layer of the multi-layer tensor processing application on the compute tiles based on the sub-volumes of the IFM tensor and the sub-volumes of the weight tensor stored in the data memory of the compute tiles, and storing outputs of the compute tiles as an output feature map (OFM) tensor of the first layer in the memory tiles; and wherein the re-configuring comprises reconfiguring the compute tiles, the memory tiles and the interface tiles to transfer sub-volumes of an OFM tensor of a preceding layer of the multi-layer tensor processing application from the memory tiles to the data memory of the compute tiles, transferring a weight tensor of a subsequent layer of the multi-layer tensor processing application from the external memory to the memory tiles, transferring sub-volumes of the weight tensor from the memory tiles to the data memory of the compute tiles, executing compute nodes of the subsequent layer of the multi-layer tensor processing application on the compute tiles to process the sub-volumes of the OFM tensor of the preceding layer stored in the data memory of the compute tiles, storing outputs of the compute tiles as an OFM tensor of the subsequent layer in the memory tiles, and transferring the OFM tensor of the subsequent layer from the memory tiles to the external memory.

\* \* \* \* \*